United States Patent
Stahmann et al.

(10) Patent No.: US 12,446,782 B2
(45) Date of Patent: Oct. 21, 2025

(54) DEVICES AND METHODS FOR ASSESSING PULMONARY CONGESTION USING OPTICAL SENSING

(71) Applicant: Cardiac Pacemakers, Inc., St. Paul, MN (US)

(72) Inventors: Jeffrey E. Stahmann, Ramsey, MN (US); Keith R. Maile, New Brighton, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 123 days.

(21) Appl. No.: 17/866,023

(22) Filed: Jul. 15, 2022

(65) Prior Publication Data
US 2023/0014499 A1    Jan. 19, 2023

Related U.S. Application Data

(60) Provisional application No. 63/223,207, filed on Jul. 19, 2021.

(51) Int. Cl.
*A61B 5/00*    (2006.01)
*A61B 5/08*    (2006.01)

(52) U.S. Cl.
CPC .............. *A61B 5/0086* (2013.01); *A61B 5/08* (2013.01); *A61B 5/4878* (2013.01); *A61B 5/6867* (2013.01); *A61B 2562/0238* (2013.01); *A61B 2562/164* (2013.01)

(58) Field of Classification Search
None
See application file for complete search history.

(56) References Cited

U.S. PATENT DOCUMENTS

| | | |
|---|---|---|
| 6,739,335 B1 | 5/2004 | Rapport et al. |
| 7,809,441 B2 | 10/2010 | Kane et al. |
| 7,813,778 B2 | 10/2010 | Benaron et al. |
| 7,865,223 B1 | 1/2011 | Bernreuter |

(Continued)

OTHER PUBLICATIONS

Meinhardt et al., "Wavelength-dependent penetration depths of ultraviolet radiation in human skin". Journal of Biomedical Optics 2008, 13(4), 044030-1 to 5. (Year: 2008).*

(Continued)

*Primary Examiner* — Yi-Shan Yang
(74) *Attorney, Agent, or Firm* — Pauly, DeVries Smith & Deffner LLC

(57) ABSTRACT

Embodiments herein relate to devices and methods for assessing pulmonary congestion using optical sensing techniques. In an embodiment, a pulmonary congestion monitoring device can be included having a first optical emitter, wherein the first optical emitter can be configured to emit light at a first wavelength, such as at a near-infrared wavelength or an ultraviolet wavelength. The monitoring device can also include a first optical detector configured to detect incident light. The first optical emitter and the first optical detector can be separated by a distance of 1 centimeters (cm) to 10 cm. The monitoring device can be configured so that the light from the first optical emitter propagates through at least one of a lung tissue and an airway tissue. The monitoring device can also be configured to use detected incident light to determine a congestion status of the lung tissue. Other embodiments are also included herein.

20 Claims, 20 Drawing Sheets

(56) References Cited

U.S. PATENT DOCUMENTS

| | | | |
|---|---|---|---|
| 8,126,554 | B2 | 2/2012 | Kane et al. |
| 8,320,981 | B1 | 11/2012 | Mayer et al. |
| 8,426,819 | B2 | 4/2013 | Herrmann |
| 8,794,236 | B2 | 8/2014 | Phuah et al. |
| 9,649,070 | B2 | 5/2017 | Seppä et al. |
| 10,398,863 | B2 | 9/2019 | Phuah et al. |
| 10,932,674 | B2 | 3/2021 | Luxon et al. |
| 11,154,249 | B2 | 10/2021 | Kuhn et al. |
| 2002/0123674 | A1* | 9/2002 | Plicchi ............... A61B 5/7207 600/300 |
| 2004/0116789 | A1 | 6/2004 | Boas et al. |
| 2006/0253016 | A1* | 11/2006 | R. Baker, Jr. ........ A61B 5/0059 600/410 |
| 2009/0163819 | A1 | 6/2009 | De Kok et al. |
| 2010/0022856 | A1 | 1/2010 | Cinbis et al. |
| 2010/0043557 | A1 | 2/2010 | Savery et al. |
| 2010/0106210 | A1* | 4/2010 | Hedberg ............. A61B 5/0086 600/301 |
| 2012/0190989 | A1 | 7/2012 | Kaiser et al. |
| 2013/0310669 | A1* | 11/2013 | Nitzan ............... A61B 5/14551 600/479 |
| 2014/0149065 | A1 | 5/2014 | Pompei et al. |
| 2017/0135633 | A1 | 5/2017 | Connor |
| 2017/0303815 | A1* | 10/2017 | De Limon ........... A61B 5/6831 |
| 2018/0073928 | A1 | 3/2018 | Nakaya et al. |
| 2018/0344252 | A1 | 12/2018 | An et al. |
| 2019/0320985 | A1 | 10/2019 | Leboeuf et al. |
| 2019/0336077 | A1* | 11/2019 | Kuhn ................... A61B 5/7282 |
| 2020/0000345 | A1 | 1/2020 | Connor |
| 2020/0029827 | A1* | 1/2020 | Tang .................... A61B 5/0205 |
| 2020/0043591 | A1* | 2/2020 | Kahlert ............... A61B 5/0082 |
| 2020/0268536 | A1 | 8/2020 | Dilorenzo |
| 2021/0045671 | A1 | 2/2021 | Wiese et al. |
| 2021/0161444 | A1 | 6/2021 | Shao et al. |
| 2021/0361238 | A1* | 11/2021 | Bak-Boychuk .... A61B 17/0057 |
| 2022/0095937 | A1 | 3/2022 | Faircloth |
| 2022/0248993 | A1 | 8/2022 | Dixon |
| 2022/0370010 | A1 | 11/2022 | Zilkie et al. |
| 2023/0017684 | A1 | 1/2023 | Stahmann et al. |
| 2023/0024917 | A1 | 1/2023 | Stahmann et al. |
| 2023/0025497 | A1 | 1/2023 | Stahmann et al. |
| 2023/0081138 | A1 | 3/2023 | Stahmann et al. |

OTHER PUBLICATIONS

Hwang, Chan-Sol, et al."Angle-selective optical filter for highly sensitive reflection photoplethysmogram," Biomedical Optics Express 4361, vol. 8, No. 10, 2017 (8 pages).

Johnston, Hamish "New material offers angular control over light," Physics World, Mar. 27, 2014 (3 pages).

Qian, Qinyu, et al."All-dielectric polarization-independent optical angular filter," Scientific Reports, Nov. 29, 2017, 7: 16574 (7 pages).

Zakirullin, Rustam "Creating optical filters with angular-selective light transmission," Applied Optics, 2015, vol. 54, No. 25 (5 pages).

Beek, J.F., et al. "The optical properties of lung as a function of respiration," Phys. Med. Biol. 42 (1997) 2263-2272 (10 pages).

Inaba, Kenti, et al. "Radiologic Evaluation of Alternative Sites for Needle Decompression of Tension Pneumothorax," Arch Surg. 2012:147(9):813-818 (6 pages).

Lichtwarck-Aschoff, Michael, et al. "Decreasing size of cardiogenic oscillations reflects decreasing compliance of the respiratory system during long-term ventilation," J. Appl. Physiol. 96; 879-884 (6 pages).

Martinsen, Paul, et al. "Temperature dependence of near-infrared spectra of whole blood," Journal of Biomedical Optics 13(3), 034016 (May/Jun. 2008) (7 pages).

Schumann, S., et al. "Cardiogenic oscillations in spontaneous breathing airway signal reflect respiratory system mechanics," Acta Anaesthesiol Scand 2011; 55: 980-986 (7 pages).

Suarez-Sipmann, Fernando, et al. "Pulmonary artery pulsatility is the main cause of cardiogenic oscillations," J Clin Monit Comput (2013) 27:47-53 (7 pages).

Tusman, Gerardo, et al. "Pulmonary blood flow generates cardiogenic oscillations," Respiratory Physiology & Neurobiology (2009) (8 pages).

"Non-Final Office Action," for U.S. Appl. No. 17/866,030 mailed May 8, 2024 (25 pages).

"Non-Final Office Action," for U.S. Appl. No. 17/864,907 mailed Sep. 30, 2024, (21 pages).

"Response to Non-Final Rejection," mailed on May 8, 2024, for U.S. Appl. No. 17/866,030, submitted via EFS-Web on Aug. 8, 2024, 9 pages.

"Final Office Action," for U.S. Appl. No. 17/866,030 mailed Nov. 6, 2024 (25 pages).

"Response to Final Rejection," mailed on Nov. 6, 2024, for U.S. Appl. No. 17/866,030, submitted via Patent Center on Feb. 6, 2025, 13 pages.

"Response to Non-Final Rejection," mailed on Sep. 30, 2024, for U.S. Appl. No. 17/864,907 submitted via Patent Center on Dec. 30, 2024, 11 pages.

"Final Office Action," for U.S. Appl. No. 17/864,907 mailed May 20, 2025, (19 pages).

"Non-Final Office Action," U.S. Appl. No. 17/864,899 mailed Jun. 16, 2025 (38 pages).

"Non-Final Office Action," for U.S. Appl. No. 17/866,030 mailed May 8, 2025 (33 pages).

Ashley, Welch "The thermal response of laser irradiated tissue," IEEE Journal of Quantum Electronics, vol. 20, No. 12, pp. 1471-1481, Dec. 1984, doi: 10.1109/JQE.1984.1072339. (11 pages).

Cotler, Howard B., et al."The Use of Low Level Laser Therapy (LLLT) for Musculoskeletal Pain," MOJ Orthop Rheumatol. 2015;2(5):00068. doi: 10.15406/mojor.2015.02.00068. Epub Jun. 9, 2015. PMID: 26858986; PMCID: PMC4743666. (16 pages).

Henderson, Theodore A, et al."Near-infrared photonic energy penetration: can infrared phototherapy effectively reach the human brain," Neuropsychiatr Dis Treat. Aug. 21, 2015 ;11:2191-208. doi: 10.2147/NDT.S78182. PM ID: 26346298; PMCID: PMC4552256. (18 pages).

"Non-Final Office Action," for U.S. Appl. No. 17/944,582 mailed Jul. 24, 2025, (30 pages).

"Non-Final Office Action," for U.S. Appl. No. 17/864,907 mailed Aug. 27, 2025 (12 pages).

"Response to Final Rejection," mailed on May 20, 2025, for U.S. Appl. No. 17/864,907, submitted via Patent Center on Aug. 20, 2025, 8 pages.

"Response to Non-Final Rejection," mailed on Jun. 16, 2025, for U.S. Appl. No. 17/864,899, submitted via Patent Center on Sep. 16, 2025, 12 pages.

"Response to Non-Final Rejection," mailed on May 8, 2025, for U.S. Appl. No. 17/866,030, submitted via Patent Center on Aug. 6, 2025, 14 pages.

* cited by examiner

DEVICES AND METHODS FOR ASSESSING PULMONARY CONGESTION USING OPTICAL SENSING

This application claims the benefit of U.S. Provisional Application No. 63/223,207, filed Jul. 19, 2021, the content of which is herein incorporated by reference in its entirety.

FIELD

Embodiments herein relate to devices and methods for assessing pulmonary congestion using optical sensing techniques.

BACKGROUND

Pulmonary congestion status of a patient is a key factor to assess as part of evaluating the overall health of a patient as well as monitoring disease progression. Pulmonary congestion is an important component of many diseases including heart failure, chronic obstructive pulmonary disease (COPD), acute respiratory distress syndrome, asthma, and septic shock. Pulmonary congestion can include alveoli and interstitium congestion due to Extravascular Lung Water (EVLW). Pulmonary congestion can also include airway congestion due to constriction, inflammation and/or mucus.

Monitoring pulmonary congestion using impedance-based sensing techniques can provide insight into the airway congestion status of a patient. However, devices required for impedance-based measurements can require lead-based technology, resulting in a more invasive device. Other impedance-based devices provide only shallow measurements that do not provide accurate measurements.

SUMMARY

Embodiments herein relate to devices and methods for assessing pulmonary congestion using optical sensing techniques. In a first aspect, a pulmonary congestion monitoring device can be included having a first optical emitter, wherein the first optical emitter can be configured to emit light at a first wavelength, such as at a near-infrared wavelength or an ultraviolet wavelength. The monitoring device can also include a first optical detector configured to detect incident light. The first optical emitter and the first optical detector can be separated by a distance of 1 centimeters (cm) to 10 cm. The monitoring device can be configured so that the light from the first optical emitter propagates through at least one of a lung tissue and an airway tissue. The monitoring device can also be configured to use detected incident light to determine a congestion status of the lung tissue.

In a second aspect, in addition to one or more of the preceding or following aspects, or in the alternative to some aspects, the first wavelength can be from 800 nm to 1000 nm.

In a third aspect, in addition to one or more of the preceding or following aspects, or in the alternative to some aspects, the first wavelength can be from 150 nm to 250 nm.

In a fourth aspect, in addition to one or more of the preceding or following aspects, or in the alternative to some aspects, wherein propagation of the emitted light through the lung tissue or the airway tissue includes propagation of the emitted light at a depth from 1 cm to 5 cm as measured from a surface of the device.

In a fifth aspect, in addition to one or more of the preceding or following aspects, or in the alternative to some aspects, further can include a second optical emitter, wherein the second optical emitter can be configured to emit light at a second wavelength.

In a sixth aspect, in addition to one or more of the preceding or following aspects, or in the alternative to some aspects, the second wavelength can be from 600 nm to 1400 nm and can be different than the first wavelength.

In a seventh aspect, in addition to one or more of the preceding or following aspects, or in the alternative to some aspects, the second wavelength can be from 625 nm to 675 nm.

In an eighth aspect, in addition to one or more of the preceding or following aspects, or in the alternative to some aspects, a proportion of air to fluid in the lung tissue as measured by evaluating a signal from the first optical detector can be determinative of pulmonary congestion.

In a ninth aspect, in addition to one or more of the preceding or following aspects, or in the alternative to some aspects, a proportion of air to fluid in the lung tissue as measured by evaluating a signal from the first optical detector can be indicative of pulmonary edema status.

In a tenth aspect, in addition to one or more of the preceding or following aspects, or in the alternative to some aspects, the device can be further configured to monitor detected incident light over a period of time to monitor a progression or regression of one or more conditions can include chronic obstructive pulmonary disease (COPD), pulmonary edema, asthma, pneumonia, airway obstruction, heart failure, acute respiratory distress syndrome (ARDS), septic shock, or pulmonary embolism.

In an eleventh aspect, in addition to one or more of the preceding or following aspects, or in the alternative to some aspects, the device can be further configured to determine at least one of extravascular lung water, airway constriction, airway mucous, and airway inflammation.

In a twelfth aspect, in addition to one or more of the preceding or following aspects, or in the alternative to some aspects, the device can further include a housing, and a flexible member, wherein the flexible member can be connected to the housing.

In a thirteenth aspect, in addition to one or more of the preceding or following aspects, or in the alternative to some aspects, the flexible member can be from 1 cm to 3 cm in length.

In a fourteenth aspect, in addition to one or more of the preceding or following aspects, or in the alternative to some aspects, the first optical emitter can be disposed on the flexible member.

In a fifteenth aspect, in addition to one or more of the preceding or following aspects, or in the alternative to some aspects, the first optical detector can be disposed on the flexible member.

In a sixteenth aspect, in addition to one or more of the preceding or following aspects, or in the alternative to some aspects, the first optical emitter and the first optical detector can be both disposed on the flexible member.

In a seventeenth aspect, in addition to one or more of the preceding or following aspects, or in the alternative to some aspects, the first optical emitter and the first optical detector can be spaced along a planar surface of the device spaced from 1 cm to 10 cm apart.

In an eighteenth aspect, in addition to one or more of the preceding or following aspects, or in the alternative to some aspects, the device can be an implantable device.

In a nineteenth aspect, in addition to one or more of the preceding or following aspects, or in the alternative to some aspects, the device can be a wearable device.

In a twentieth aspect, in addition to one or more of the preceding or following aspects, or in the alternative to some aspects, further can include a measurement circuit, wherein the measurement circuit can be configured to control operation of the first optical emitter and the first optical detector.

In a twenty-first aspect, a method for measuring a pulmonary congestion status in a patient can be included, the method can include contacting a pulmonary congestion monitoring device with a tissue of the patient. The pulmonary congestion monitoring device can include an optical sensor, the optical sensor can include a first optical emitter, and a first optical detector. The method can also include propagating an emitted light from the first optical emitter at a first wavelength to a region of a lung tissue or an airway tissue. The first wavelength can include a near-infrared wavelength or an ultraviolet wavelength. The method can also include detecting an incident light with the first optical detector and determining a pulmonary congestion status of the lung tissue or the airway tissue based on the detected incident light.

In a twenty-second aspect, in addition to one or more of the preceding or following aspects, or in the alternative to some aspects, wherein determining the pulmonary congestion status includes performing a ratiometric calculation using at least one of a measured light absorption, light scattering, or phase.

In a twenty-third aspect, in addition to one or more of the preceding or following aspects, or in the alternative to some aspects, the optical sensor can include a second optical emitter, and the method further can include propagating an emitted light from the second optical emitter at a second wavelength to a region of the lung tissue or the airway tissue.

In a twenty-fourth aspect, in addition to one or more of the preceding or following aspects, or in the alternative to some aspects, wherein determining the pulmonary congestion status includes performing a ratiometric calculation using at least one of a measured light absorption, light scattering, or phase of the first wavelength and the second wavelength.

In a twenty-fifth aspect, in addition to one or more of the preceding or following aspects, or in the alternative to some aspects, the method can further include implanting the pulmonary congestion monitoring device subcutaneously at or near a site of a lung tissue and arranging the monitoring device so that the first light emitter and the first light detector can be directed toward an interior of the patient toward a surface of the lung tissue.

In a twenty-sixth aspect, in addition to one or more of the preceding or following aspects, or in the alternative to some aspects, the emitted light can be propagated at a depth of from 1 cm to 5 cm away from a surface of the pulmonary congestion monitoring device.

In a twenty-seventh aspect, in addition to one or more of the preceding or following aspects, or in the alternative to some aspects, the emitted light can be propagated at a first depth and a second depth.

In a twenty-eighth aspect, in addition to one or more of the preceding or following aspects, or in the alternative to some aspects, determining the pulmonary congestion status includes performing a ratiometric calculation using at least one of a measured absorption, light scattering or phase reflecting the first depth and the second depth.

In a twenty-ninth aspect, in addition to one or more of the preceding or following aspects, or in the alternative to some aspects, determining the pulmonary congestion status of the lung tissue can include measuring at least one physical property of the lung tissue can include extravascular lung water, airway constriction, airway mucous, and airway inflammation.

In a thirtieth aspect, in addition to one or more of the preceding or following aspects, or in the alternative to some aspects, the method can further include monitoring a progression or regression of one or more conditions can include chronic obstructive pulmonary disease (COPD), pulmonary edema, asthma, pneumonia, airway obstruction, heart failure, acute respiratory distress syndrome (ARDS), septic shock, or pulmonary embolism.

In a thirty-first aspect, in addition to one or more of the preceding or following aspects, or in the alternative to some aspects, the method can further include measuring one or more of a heart rate, a respiratory rate, a tidal volume, circadian rhythm, posture, or an extravascular lung water concentration.

In a thirty-second aspect, in addition to one or more of the preceding or following aspects, or in the alternative to some aspects, wherein measuring one or more of a heart rate, a respiratory rate, a tidal volume, circadian rhythm, posture, or an extravascular lung water concentration can be further used to determine the pulmonary congestion status.

In a thirty-third aspect, in addition to one or more of the preceding or following aspects, or in the alternative to some aspects, the method can further include measuring at least one of light absorption, light scattering, or phase with the first optical detector.

In a thirty-fourth aspect, in addition to one or more of the preceding or following aspects, or in the alternative to some aspects, the method can further include creating a composite score using at least two of the measured light absorption, light scattering, or phase.

In a thirty-fifth aspect, in addition to one or more of the preceding or following aspects, or in the alternative to some aspects, the method can further include calculating an AC signal component and a DC signal component of the detected incident light to determine the pulmonary congestion status of the lung tissue, wherein the AC signal component and the DC signal component can be used for determining a ratio of ratios between the ratio of the AC signal component to the DC signal component at the first wavelength to the ratio of the AC signal component to the DC signal component at the second wavelength.

In a thirty-sixth aspect, in addition to one or more of the preceding or following aspects, or in the alternative to some aspects, the method can further include providing a therapy to the patient upon determining the pulmonary congestion status of the lung tissue.

In a thirty-seventh aspect, a system for detecting a pulmonary congestion status of a patient can be included having a first pulmonary congestion monitoring device. The first pulmonary congestion monitoring device can include a first optical emitter configured to emit light at a first wavelength from 800 nm to 1000 nm and a first optical detector configured to detect incident light. The system can include at least one secondary sensor can include a pulse oximetry sensor, a chemical sensor, a posture sensor, or a heart rate sensor. Light from the first optical emitter can be configured to propagate through a lung tissue. Detected incident light and secondary sensor data can be used to determine a pulmonary congestion status of the lung tissue.

In a thirty-eighth aspect, in addition to one or more of the preceding or following aspects, or in the alternative to some aspects, the system can be configured to determine the pulmonary congestion status by utilizing a ratiometric calculation using at least one of a measured absorption, light scattering or phase.

In a thirty-ninth aspect, in addition to one or more of the preceding or following aspects, or in the alternative to some aspects, the ratiometric calculation includes a ratio of at least one of a measured absorption, light scattering or phase at a first depth and at a second depth.

In a fortieth aspect, in addition to one or more of the preceding or following aspects, or in the alternative to some aspects, the ratiometric calculation includes a ratio of at least one of a measured absorption, light scattering or phase at a first wavelength and at a second wavelength.

In a forty-first aspect, in addition to one or more of the preceding or following aspects, or in the alternative to some aspects, the system can be configured to deliver a therapy to the patient after determining a pulmonary congestion status of the lung tissue.

In a forty-second aspect, in addition to one or more of the preceding or following aspects, or in the alternative to some aspects, wherein at least one of the pulmonary congestion monitoring device or the secondary sensor can be implantable.

In a forty-third aspect, in addition to one or more of the preceding or following aspects, or in the alternative to some aspects, the system can further include a second pulmonary congestion monitoring device, the second pulmonary congestion monitoring device can include a second optical emitter configured to emit light and a second optical detector configured to detect incident light.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Embodiments herein relate to devices and methods for assessing pulmonary congestion using optical sensing techniques. As discussed above, measuring airway congestion with an impedance-based approach has substantial limitations. However, the systems, devices, and methods herein can use optical technique for determining and/or monitoring airway congestion within a patient emitting light such that it can penetrate deeply (such as at depths of greater than one centimeter) into tissues and accurately measure pulmonary congestion.

Assessing pulmonary congestion within lung tissue using optical sensing can be achieved by using light propagation through deep tissues of the body. For example, light emitted from an optical emitter of a pulmonary congestion monitoring device can propagate deeply into a patient's tissues and back to the optical detector of the pulmonary congestion monitoring device. As light travels through the tissues of a patient, it can be affected by various optical properties including transmittance, reflectance, absorption, light attenuation, scattering, wavelength, current, and fluorescence. The devices herein can be configured to cause light to penetrate deeply into the tissue by optimizing emitter-detector spacing, wavelength selection, and/or the use of multiple wavelengths. Thus, devices and systems herein can be configured to utilize the optical properties of light having passed through deep tissue to sense physiological parameters such as pulmonary congestion at significant internal depths within a patient, such as where the depth is greater than one centimeter.

Figure 1:
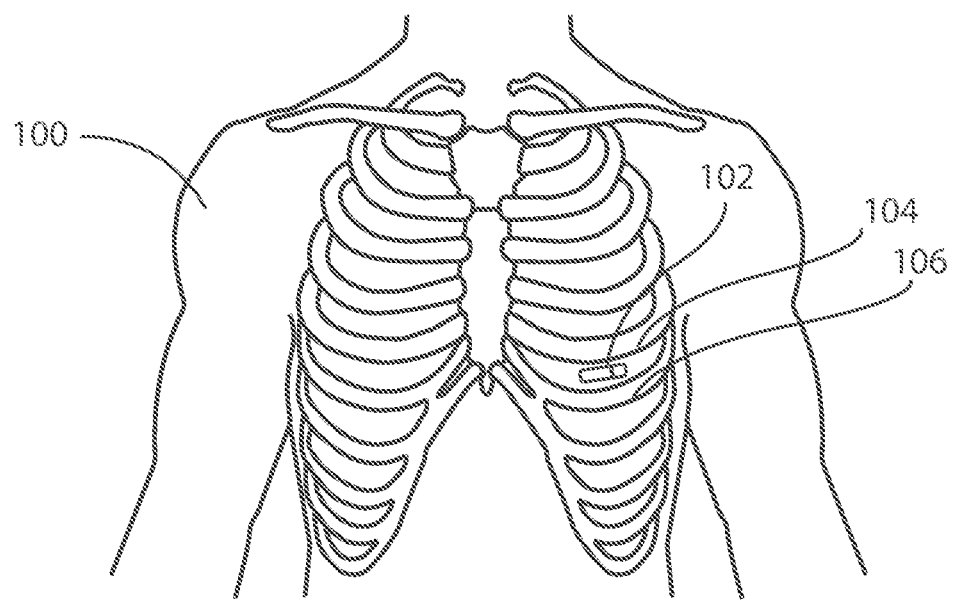
FIG. 1 is a schematic view of an implanted pulmonary congestion monitoring device in accordance with various embodiments herein.

Devices and/or systems herein can take the form of implantable devices, wearable devices, or a combination of both. Specifically, devices and/or systems herein can include pulmonary congestion monitoring devices that include implantable pulmonary congestion monitoring devices, wearable pulmonary congestion monitoring devices, or a combination of both types of devices. Referring now to FIG. 1, a schematic view of an implantable pulmonary congestion monitoring device is shown in accordance with various embodiments herein. The pulmonary congestion monitoring device 102 is shown in FIG. 1 as being positioned between the left fifth rib 104 and the left sixth rib 106 within the left fifth intercostal space of patient 100. While placement of the pulmonary congestion monitoring device 102 is shown within the left fifth intercostal space, it will be appreciated that the pulmonary congestion monitoring device 102 can be implanted within other locations of the body, and in particular, in or adjacent to other intercostal spaces along either the right side or the left side of a patient's rib cage and in anterior, lateral, posterior, superior or inferior thoracic locations.

The implantation depth of the pulmonary congestion monitoring device can include implantation depths of from 1 millimeter (mm) to 25 mm or more below the skin layer of a patient's body. In some embodiments, the implantation depth below the skin layer can be greater than or equal to 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm, or can be an amount falling within a range between any of the foregoing.

The implantation depth can be tailored to provide a pulmonary congestion monitoring device to lung (or other pulmonary tissue) distance of from 1 mm to 45 mm or more. In some embodiments, the distance between the pulmonary congestion monitoring device and the lung (or other pulmonary tissue) can be greater than or equal to 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 31 mm, 32 mm, 33 mm, 34 mm, 35 mm, 36 mm, 37 mm, 38 mm, 39 mm, 40 mm 41 mm, 42 mm, 43 mm, 44 mm, or 45 mm, or can be an amount falling within a range between any of the foregoing.

In some scenarios, the implantable pulmonary congestion monitoring devices embodied herein can be used in combination with various types of implantable therapeutic devices, including, but not limited to, implantable cardiac monitoring devices, implantable cardiac rhythm management devices, implantable pacemakers, implantable cardioverter-defibrillator devices, and the like. For example, such implantable therapeutic devices can be implanted along with the pulmonary congestion monitoring devices described herein. In other embodiments, the implantable oxygenation monitoring features/functionality herein can be included within an implantable therapeutic device.

Figure 2:
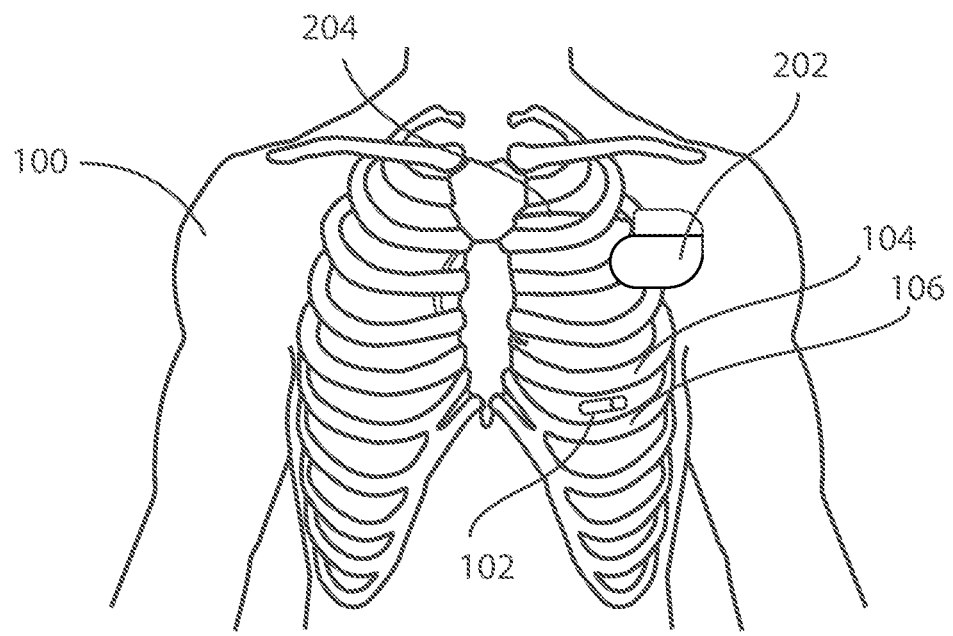
FIG. 2 is a schematic view of an implanted pulmonary congestion monitoring device system in accordance with various embodiments herein.

Referring now to FIG. 2, a schematic view of an implantable pulmonary congestion monitoring device is shown in accordance with various embodiments herein.

The pulmonary congestion monitoring device 102 is shown in FIG. 2 as being positioned between the left fifth rib 104 and the left sixth rib 106 within the left fifth intercostal space of patient 100. FIG. 2 further includes an implantable therapeutic device 202 positioned within the chest of the patient 100. Implantable therapeutic device 202 can be implanted at any position within patient 100 to provide a desired therapy to the patient in conjunction with signals determined by the pulmonary congestion monitoring device, as will be discussed elsewhere herein. Implantable therapeutic device 202 can include one or more electrical stimulation leads 204 placed within the body of patient 100 at or near a treatment site.

Figure 3:
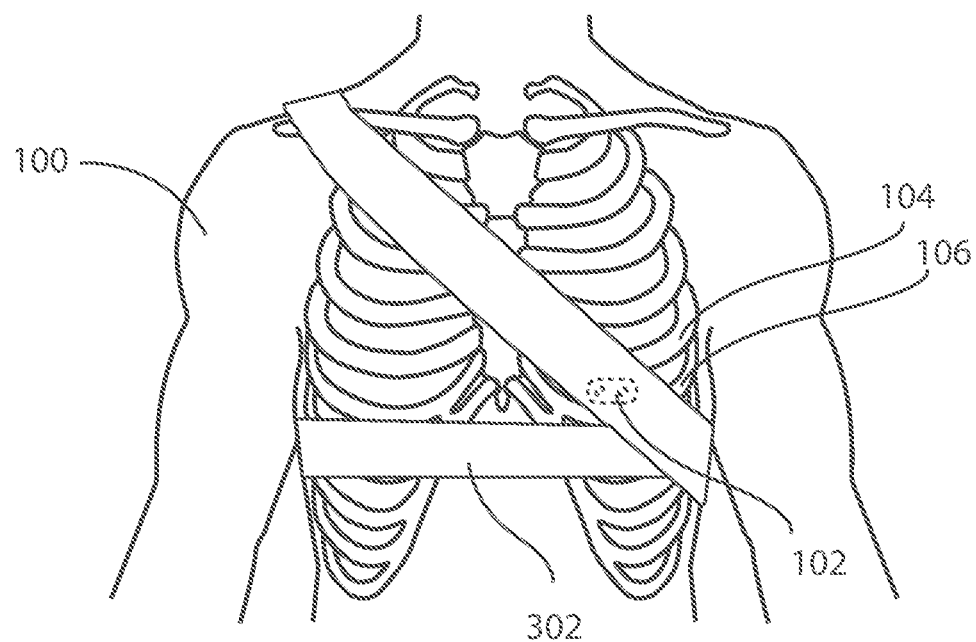
FIG. 3 is a schematic view of a wearable pulmonary congestion monitoring device in accordance with various embodiments herein.

As referenced above, the pulmonary congestion monitoring devices herein can include those that are wearable devices. Referring now to FIG. 3, a schematic view of a wearable pulmonary congestion monitoring device is shown in accordance with various embodiments herein. The pulmonary congestion monitoring device 102 can be disposed along a length of a wearable strap 302 (as merely one example of a device or technique that can be used to hold the pulmonary congestion monitoring device 102 in position) and externally positioned between the left fifth rib 104 and the left sixth rib 106 over the left fifth intercostal space of patient 100. While placement of the pulmonary congestion monitoring device 102 is shown placed over the left fifth intercostal space, it will be appreciated that the pulmonary congestion monitoring device 102 can also be positioned over or adjacent to other intercostal spaces along either the right side or the left side of a patient's rib cage.

Figure 4:
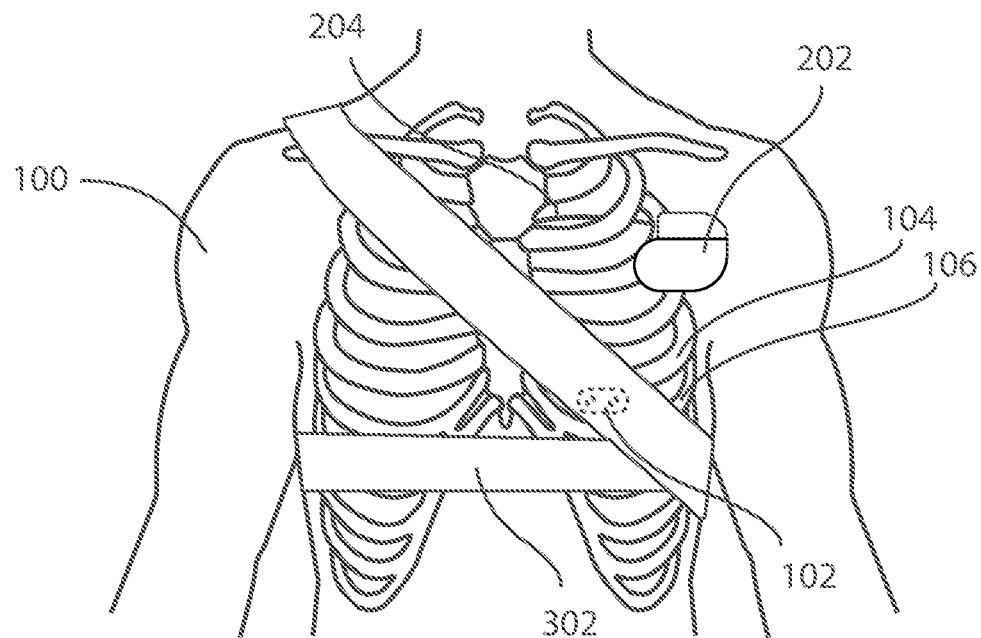
FIG. 4 is a schematic view of a wearable pulmonary congestion monitoring device system in accordance with various embodiments herein.

The wearable pulmonary congestion monitoring devices embodied herein can be used in combination with various types of implantable therapeutic devices, such as those described above. The wearable oxygenation monitoring devices embodied herein can be used in combination with various types of implantable monitoring devices, such as implantable cardiac monitors. The implantable therapeutic or implantable monitoring devices can be implanted and used in a system in conjunction with the wearable pulmonary congestion monitoring devices described herein. Referring now to FIG. 4, a schematic view of a wearable pulmonary congestion monitoring device is shown in accordance with various embodiments herein. The wearable pulmonary congestion monitoring device 102 can be disposed along a length of a wearable strap 302 and externally positioned between the left fifth rib 104 and the left sixth rib 106 over the left fifth intercostal space of patient 100 or at another site. FIG. 4 further shows an implantable therapeutic device 202 positioned within the chest of the patient 100. Implantable therapeutic device 202 can be implanted at any position within patient 100 to provide a desired therapy to the patient in conjunction with signals determined by the pulmonary congestion monitoring device, as discussed elsewhere herein. Implantable therapeutic device 202 can include one or more electrical stimulation leads 204 placed within the body of patient 100 at or near a treatment site. In some embodiments, the wearable pulmonary congestion monitoring devices herein can be or be included with a patch sensor temporarily affixed to a patient by an adhesive, or it can be a garment worn on the body of a patient.

Figure 5:
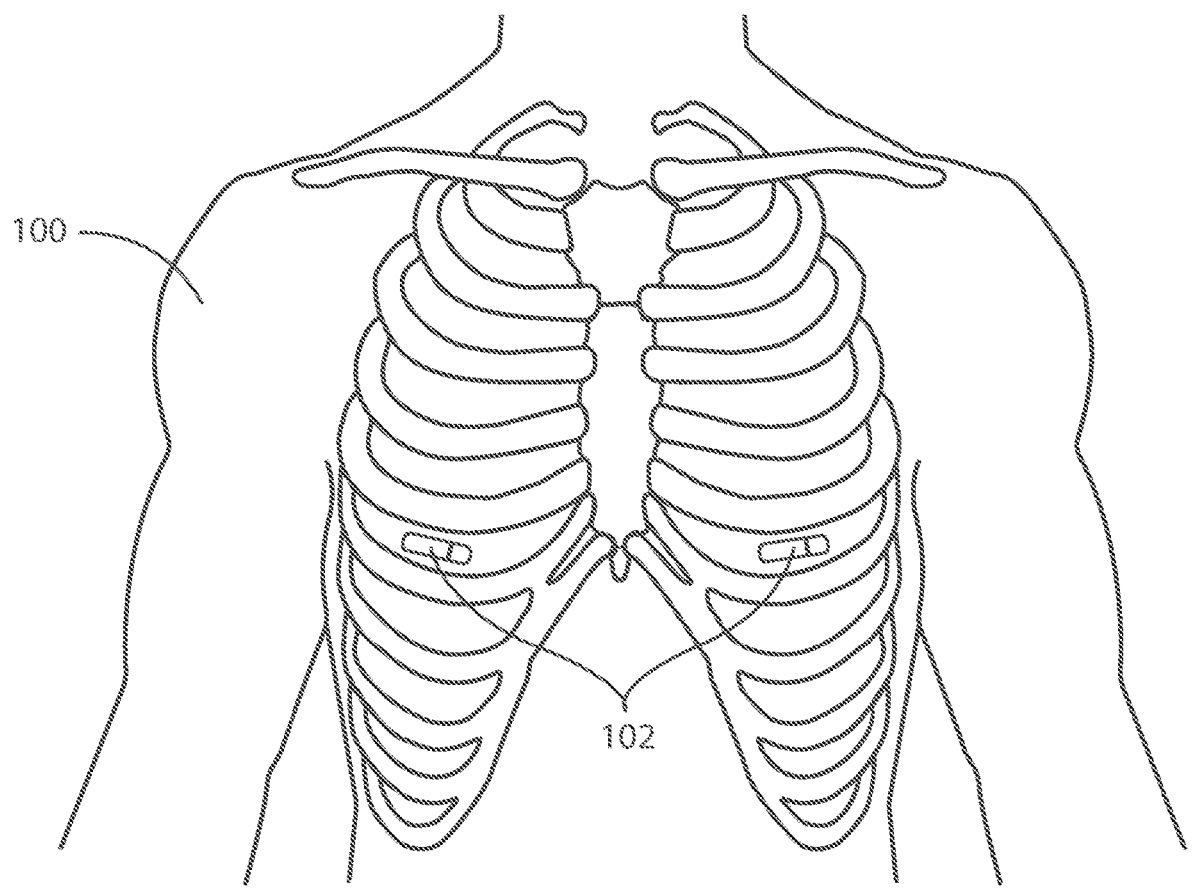
FIG. 5 is a schematic view of a system including multiple implanted pulmonary congestion monitoring devices in accordance with various embodiments herein.

In some embodiments only a single pulmonary congestion monitoring device may be implanted while in other embodiments multiple pulmonary congestion monitoring devices can be implanted within a patient. Referring now to FIG. 5, a schematic view of a system with multiple implantable pulmonary congestion monitoring devices is shown in accordance with various embodiments herein. The pulmonary congestion monitoring devices 102 are shown in FIG. 5 as being positioned between the fifth rib and the sixth rib within the left fifth intercostal space and right fifth intercostal space, respectively. While placement of the pulmonary congestion monitoring devices 102 are shown within the left fifth intercostal space and right fifth intercostal space, it will be appreciated that the pulmonary congestion monitoring devices 102 can be placed within a combination of intercostal spaces along either the right side or the left side of a patient's rib cage or at other sites.

While FIG. 5 shows a combination of two pulmonary congestion monitoring devices implanted within the intercostal spaces of patient 100, it will be appreciated that more than two pulmonary congestion monitoring devices can be implanted within patient 100. In some embodiments, two, three, four, or five pulmonary congestion monitoring devices can be implanted within patient 100. In other embodiments, more than five pulmonary congestion monitoring devices can be implanted within patient 100.

The pulmonary congestion monitoring devices herein can be configured to determine a pulmonary congestion status of a lung tissue. In various embodiments, the pulmonary congestion monitoring devices herein can be further configured to monitor a progression or regression over a period of time of one or more conditions such as chronic obstructive pulmonary disease (COPD), pulmonary edema, asthma, pneumonia, airway obstruction, heart failure, acute respiratory distress syndrome (ARDS), septic shock, pulmonary effusion, or pulmonary embolism. In other embodiments, the pulmonary congestion monitoring devices herein can be further configured to determine one or more of a heart rate, a respiratory rate, a tidal volume, or an extravascular lung water concentration, as discussed elsewhere herein.

In various embodiments, pulmonary congestion monitoring devices can be implanted along with at least one secondary sensor. The secondary sensors can include, but are not to be limited to, a pulse oximetry sensor, a chemical sensor, a posture sensor, or a heart rate sensor. Secondary sensors can be used to determine one or more of a heart rate, a respiratory rate, a tidal volume, or an extravascular lung water concentration. It will be appreciated that in various embodiments, the optical emitters and optical detectors can be disposed together on the same side of the pulmonary congestion monitoring device, while the secondary sensors can be disposed on the opposite side of the pulmonary congestion monitoring device. In other embodiments, the optical emitters, optical detectors, and secondary sensors can be disposed together on the same side of the pulmonary congestion monitoring device. In some embodiments one or more of the pulmonary congestion monitoring devices is/are implanted and one or more of the pulmonary monitoring devices is/are wearable.

The pulmonary congestion monitoring devices herein can include various components, such as optical emitters, optical detectors, secondary sensors, and optical barriers in various configurations in accordance with the embodiments herein and as shown and described in reference to FIGS. 6-13.

Figure 6:
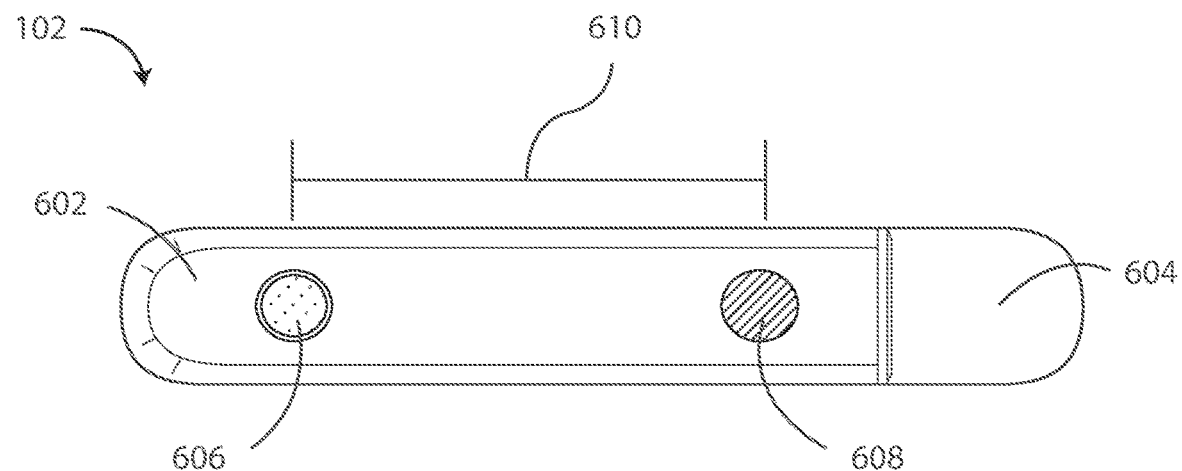
FIG. 6 is a schematic top view of a pulmonary congestion monitoring device in accordance with various embodiments herein.

Referring now to FIG. 6, a pulmonary congestion monitoring device 102 is shown in accordance with the embodiments herein. In this embodiment, the pulmonary congestion monitoring device 102 can include a housing 602 and a header 604 coupled to the housing 602. Various materials can be used to form the housing 602 and the header 604. In some embodiments, the housing 602 can be formed of a material such as a metal, ceramic, a polymer, or a composite. In some embodiments, all or part of housing 602 can be transparent. The header 604 can be formed of various materials, and in some embodiments the header 604 can be formed of a translucent polymer such as an epoxy material. In some embodiments the header 604 can be hollow. In other embodiments the header 604 can be filled with components and/or structural materials such as epoxy or another material such that it is non-hollow. In yet other embodiments, the pulmonary congestion monitoring device 102 can be devoid of a header 604 or can include a header at either end or both ends of the pulmonary congestion monitoring device. In an embodiment part of all of the housing 602 can be transparent to provide a window for optical components of the pulmonary congestion monitoring device 102.

In various embodiments, the pulmonary congestion monitoring device 102 can include a first optical emitter 606 and a first optical detector 608, each coupled to the housing 602. The first optical emitter 606 can be configured to emit light at a first wavelength of from 100 nanometers (nm) to 2000 nm. In various embodiments, the first wavelength includes a near-infrared wavelength or an ultraviolet wavelength. In various embodiments, the first optical emitter can be configured to emit light at a first wavelength of from 800 nm to 1000 nm. In some embodiments, the first optical emitter can be configured to emit light at a first wavelength of from 150 nm to 250 nm. In various embodiments, the first optical emitter 606 can be configured to emit light at a first wavelength that can be greater than or equal to 100 nm, 200 nm, 300 nm, 400 nm, 500 nm, 600 nm, 700 nm, 800 nm, 900 nm, 1000 nm, 1100 nm, 1200 nm, 1300 nm, 1400 nm, 1500 nm, 1600 nm, 1700 nm, 1800 nm, 1900 nm, or 2000 nm, or can be any wavelength falling within a range between any of the foregoing.

The first optical detector 608 can be configured to detect incident light originating from one or more optical emitters, such as the first optical emitter 606. The first optical detector 608 can be configured to detect light after it has propagated into the tissue of a patient to a given depth from the first optical emitter 606 and back to the first optical detector 608. For example, the pulmonary congestion monitoring device 102 can be configured to provide for the propagation of the emitted light through a lung tissue or other pulmonary tissue such that propagation of the emitted light occurs from about 1 centimeter (cm) in depth to 5 cm in depth as measured from a surface of the pulmonary congestion monitoring device 102 to a target tissue. In some embodiments, the depth or propagation of the emitter light can be greater than or equal to 1 cm, 2 cm, 3 cm, 4 cm, or 5 cm, or can be an amount falling within a range between any of the foregoing.

In various embodiments, the configuration of the pulmonary congestion monitoring device 102 can allow for the propagation of the emitted light through a lung tissue or other pulmonary tissue when a surface of the pulmonary congestion monitoring device 102 is directed to the interior of a patient's body toward the surface of the lung tissue or other pulmonary tissue. The detected incident light can be used to determine a congestion status of lung or other pulmonary tissue within a patient. In various embodiments herein, the light from the first optical emitter is configured to propagate through at least one of a lung tissue and another pulmonary tissue such as airway tissue. The lung tissue discussed herein can include, but is not to be limited to, alveolar tissue and associated vasculature. The airway tissue discussed herein can include, but is not to be limited to, any of the structures of the bronchial tree including any of the right or left bronchus, the bronchi, the bronchioles, or the trachea.

It will be appreciated that first optical emitter 606 and first optical detector 608 can be positioned at any location along pulmonary congestion monitoring device 102 to achieve optimal propagation of light into the tissue of a patient. The first optical emitter 606 and first optical detector 608 can be spaced along a length of the pulmonary congestion monitoring device 102 at a distance 610 from 1 cm to 10 cm apart. In some embodiments, a distance 610 separating the first optical emitter and the first optical detector can be greater than or equal to 1 cm, 2 cm, 3 cm, 4 cm, 5 cm, 6 cm, 7 cm, 8 cm, 9 cm, 10 cm, 11 cm, 12 cm, 13 cm, 14 cm, or 15 cm, or can be an amount falling within a range between any of the foregoing. In various embodiments, the first optical emitter and the first optical detector are spaced along a planar surface of the pulmonary congestion monitoring device of from 1 cm to 10 cm apart. In various embodiments, the first optical emitter and the first optical detector are spaced along a substantially flat, planar surface of the pulmonary congestion monitoring device of from 1 cm to 10 cm apart.

The pulmonary congestion monitoring device 102 can take on various dimensions in the length, width, and thickness directions. In a particular embodiment herein, it can be approximately 5 to 10 cm in length, 1 cm to 1.5 cm wide, and 0.25 cm to 1.0 cm thick. In some embodiments, the length of pulmonary congestion monitoring device 102 can be greater than or equal to 1 cm, 2 cm, 3 cm, 4 cm, 5 cm, 6 cm, 7 cm, 8 cm, 9 cm, 10 cm, 11 cm, 12 cm, 13 cm, 14 cm, or 15 cm, or can be an amount falling within a range between any of the foregoing. In some embodiments, the pulmonary congestion monitoring device 102 can be about 0.25 cm, 0.5 cm, 0.75 cm, 1.0 cm, or 2.0 cm in width. In some embodiments the width can be in a range wherein any of the foregoing widths can serve as the upper or lower bound of the range, provided that the upper bound is greater than the lower bound. In some embodiments, the pulmonary congestion monitoring device 102 can be about 0.25 cm, 0.50 cm, 0.75 cm or 1.0 cm, 1.25 cm, 1.50 cm, 1.75 cm, 2.0 cm, 2.25 cm, 2.50 cm, or 3.0 cm thick, or can be an amount falling within a range between any of the foregoing. In some embodiments the thickness can be in a range wherein any of the foregoing thicknesses can serve as the upper or lower bound of the range, provided that the upper bound is greater than the lower bound.

Figure 7:
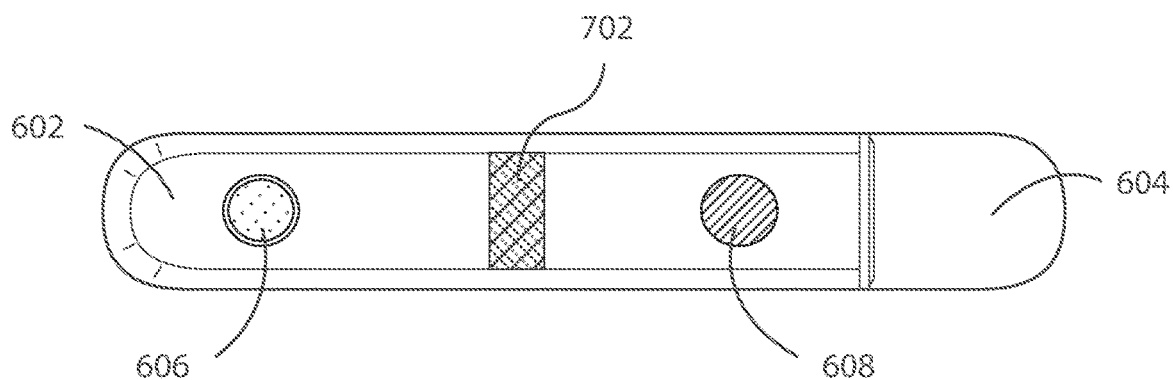
FIG. 7 is a schematic top view of a pulmonary congestion monitoring device in accordance with various embodiments herein.

In various embodiments, the pulmonary congestion monitoring devices herein can include an optical barrier device disposed between the optical emitters and optical detectors to prevent a direct path for light emitted from an optical emitter to an optical detector. Referring now to FIG. 7, a pulmonary congestion monitoring device 102 is shown in accordance with the embodiments herein. The pulmonary congestion monitoring device 102 can include the features of the pulmonary congestion monitoring device 102 of FIG. 6 and can further include an optical barrier device 702 disposed in between the first optical emitter 606 and the first optical detector 608. In some embodiments, the optical barrier device 702 can be mounted on the surface of the pulmonary congestion monitoring device 102. In some embodiments, the optical barrier device 702 can be at least partially embedded in the surface of the pulmonary congestion monitoring device 102. The optical barrier device 702 can include various materials including light blocking such as opaque polymers, metals, dyed materials, and the like.

Figure 8:
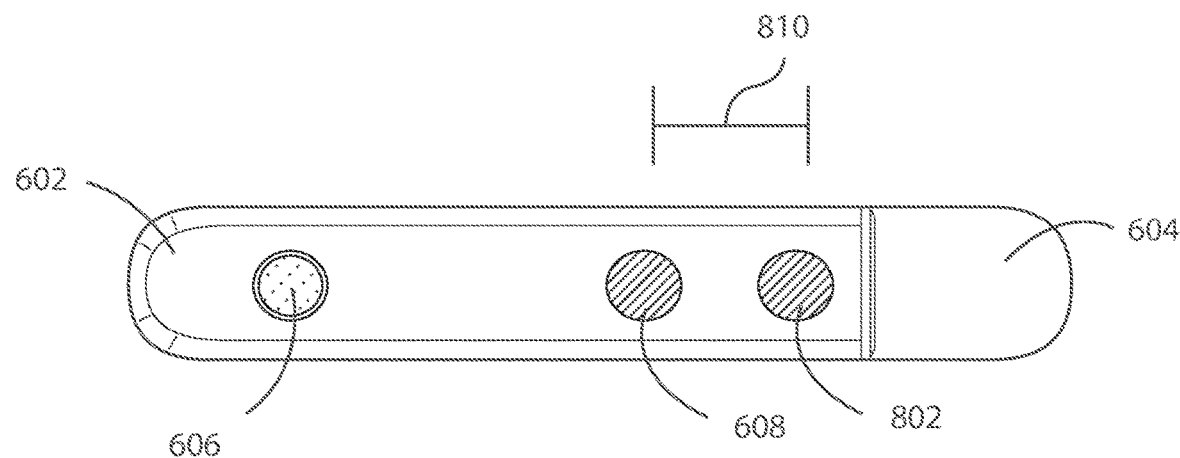
FIG. 8 is a schematic top view of a pulmonary congestion monitoring device in accordance with various embodiments herein.

It will be appreciated that the pulmonary congestion monitoring devices embodied herein can include various configurations of multiple optical emitters or optical detectors disposed along a length of the pulmonary congestion monitoring devices. Referring now to FIG. 8, a pulmonary congestion monitoring device 102 is shown in accordance with the embodiments herein. The pulmonary congestion monitoring device 102 can include a housing 602 and a header 604 coupled to the housing 602. The pulmonary congestion monitoring device 102 can include a first optical emitter 606, a first optical detector 608, and a second optical detector 802, each coupled to the housing 602. The first optical emitter 606 and first optical detector 608 can be spaced along a length of the pulmonary congestion monitoring device 102 as discussed in reference to FIG. 6. The first optical detector 608 and the second optical detector 802 can be disposed along a length of the pulmonary congestion monitoring device 102 at a distance 810 of from 1 cm to 5 cm or more apart. The second optical detector 802 can be configured to detect incident light. In some embodiments, the distance 810 between the first optical detector and the second optical detector can be greater than or equal to 0.25 cm, 0.5 cm, 1 cm, 2 cm, 3 cm, 4 cm, 5 cm, or more, or can be an amount falling within a range between any of the foregoing. Subject to other factors, the greater distance 610 (e.g., the distance between an emitter and a detector) is, the greater the depth of propagation of light through the tissue.

Figure 9:
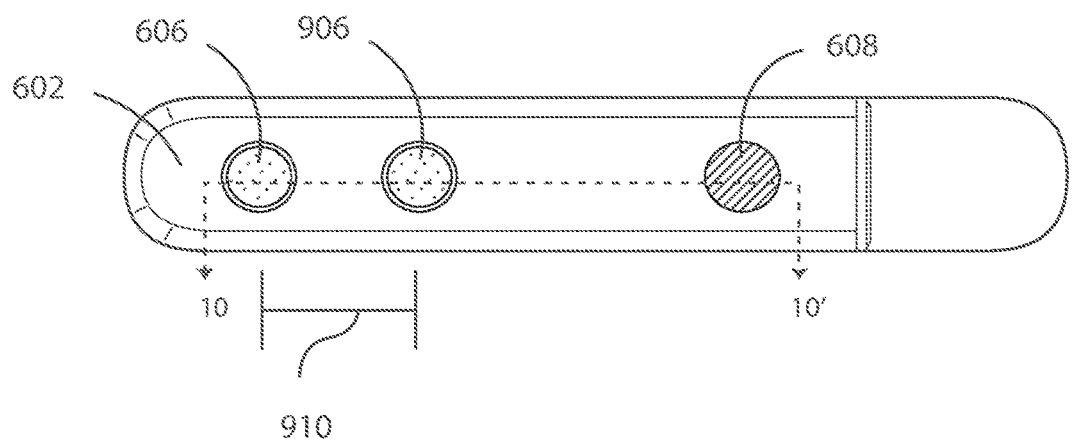
FIG. 9 is a schematic top view of a pulmonary congestion monitoring device in accordance with various embodiments herein.

Referring now to FIG. 9, a pulmonary congestion monitoring device 102 is shown in accordance with the embodiments herein. The pulmonary congestion monitoring device 102 can include a housing 602 and a header 604 coupled to the housing 602. The pulmonary congestion monitoring device 102 can include a first optical emitter 606, a second optical emitter 906, and first optical detector 608, each coupled to the housing 602. The first optical emitter 606 and first optical detector 608 can be spaced along a length of the pulmonary congestion monitoring device 102 as discussed in reference to FIG. 6. The first optical emitter 606 and the second optical emitter 906 can be disposed at a distance 910 of from 1 cm to 5 cm apart. In some embodiments, the length of the pulmonary congestion monitoring device 102 at a distance 910 between the first optical emitter and the second optical emitter can be greater than or equal to 0.25 cm, 0.5 cm, 1 cm, 2 cm, 3 cm, 4 cm, or 5 cm, or more, or can be an amount falling within a range between any of the foregoing. It will be appreciated, however, that the depth of propagation of light through tissue is dependent on the distance between the emitter and the detector and not the distance between the emitters.

The second optical emitter 906 can be configured to emit light at a second wavelength when present on a pulmonary congestion monitoring device with a first optical emitter. In various embodiments, the second optical emitter 906 can be configured to emit light at a second wavelength different than the first wavelength emitted from the first optical emitter 606. In various embodiments, the second optical emitter can be configured to emit light at a second wavelength of from 600 nm to 1400 nm. In some embodiments, the second optical emitter can be configured to emit light at a second wavelength of from 625 nm to 900 nm. In various embodiments, the first optical emitter 606 can be configured to emit light at a second wavelength that can be greater than or equal to 600 nm, 700 nm, 800 nm, 900 nm, 1000 nm, 1100 nm, 1200 nm, 1300 nm, or 1400 nm, or can be an amount falling within a range between any of the foregoing.

It will be appreciated that optical emitters herein can be used substantially continuously or only during certain time periods. For example, in some cases, the device and/or system can be configured to measure pulmonary congestion continuously or substantially continuously. In such a scenario, an optical emitter can be turned on continuously or intermittently as part of a duty cycle such as a certain fraction of time that the emitter is emitting light. It will be appreciated, however, that continuous operation of an emitter may consume substantial energy and lower the battery life of an implanted device. Thus, as a further example, in some embodiments, the device or system can evaluate pulmonary congestion only during certain periods of time. For example, the device or system can evaluate pulmonary congestion only when it receives a command to measure pulmonary congestion coming from a different device or from a clinician or other system user. As another example, the device or system can evaluate pulmonary congestion according to a preset schedule. As another example, the device or system can evaluate pulmonary congestion after detecting a particular occurrence or event using one or more sensors, such as an abnormal heart rhythm, an abnormal respiration pattern, or the like. In scenarios where there is more than one emitter, the emitters can be turned on simultaneously or in an alternating pattern.

It will be appreciated that the optical emitters and optical detectors can be formed from various materials. Optical emitters can include a light source such as a light emitting diode (LED), vertical-cavity surface-emitting lasers (VCSELs), electroluminescent (EL) devices, and the like. Optical detectors can include a component selected from the group including of a photodiode, a phototransistor, a charge-coupled device (CCD), a junction field effect transistor (JFET) optical sensor, a complementary metal-oxide semiconductor (CMOS) optical sensor, an integrated photo detector integrated circuit, a light to voltage converter, and the like. Optical emitters and optical detectors are discussed in further detail below.

Figure 10:
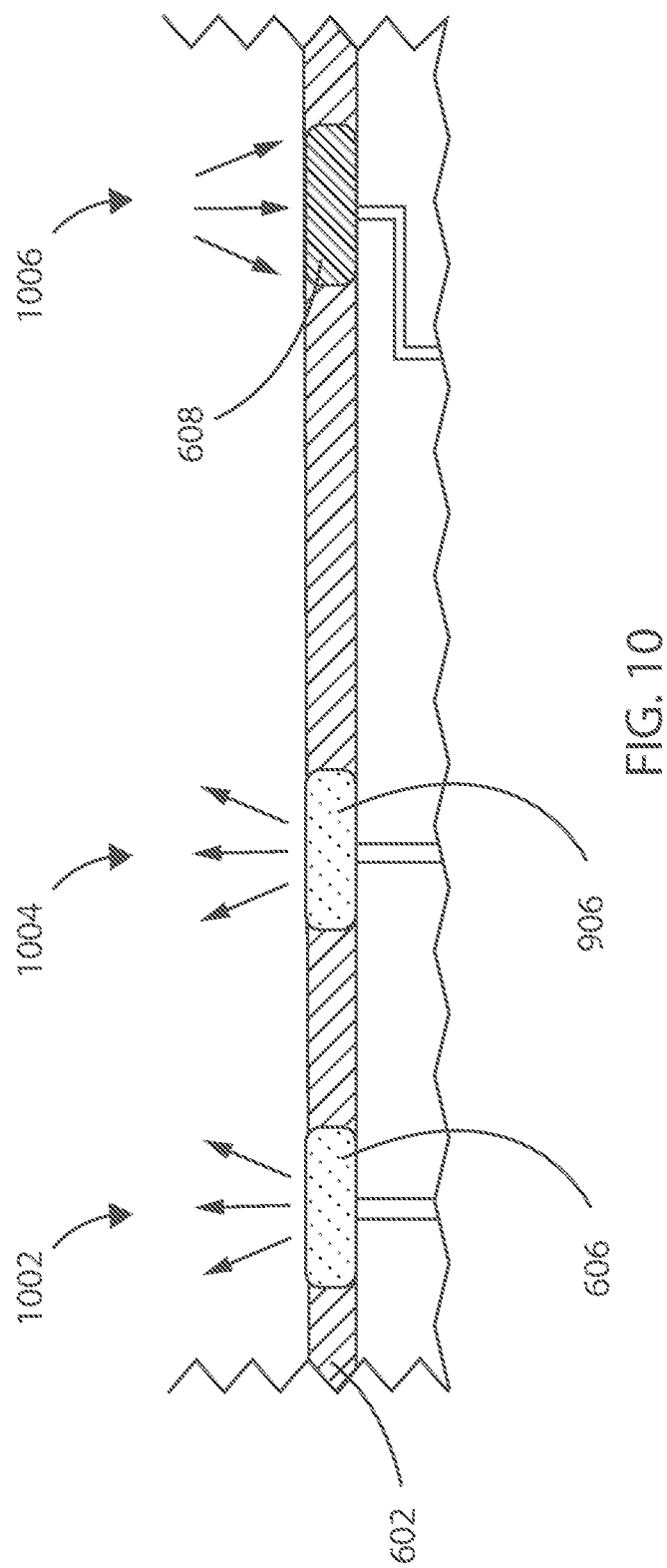
FIG. 10 is a schematic cross-sectional view of a pulmonary congestion monitoring device along line 10-10' of FIG. 9 in accordance with various embodiments herein.

Referring now to FIG. 10, a cross-sectional view of a pulmonary congestion monitoring device is shown in accordance with various embodiments herein. Pulmonary congestion monitoring device includes housing 602 having a first optical emitter 606, a second optical emitter 906, and a first optical detector 608. In various embodiments, the first optical emitter 606 can be configured to emit light at a first wavelength 1002 from 100 nm to 2000 nm. The second optical emitter 906 can be configured to emit light at a second wavelength 1004 from 800 nm to 2000 nm. The emitted light of a first wavelength from the first optical emitter can be propagated to a different depth than the emitted light of a second wavelength from the second optical emitter. The first optical detector 608 is configured to detect incident light 1006 that returns to the first optical detector 608 from either the first optical emitter 606, the second optical emitter 906, or both. It will be appreciated that the pulmonary congestion monitoring devices herein can include any combination of one or more optical emitters, optical detectors, and secondary sensors, as described below.

Figure 11:
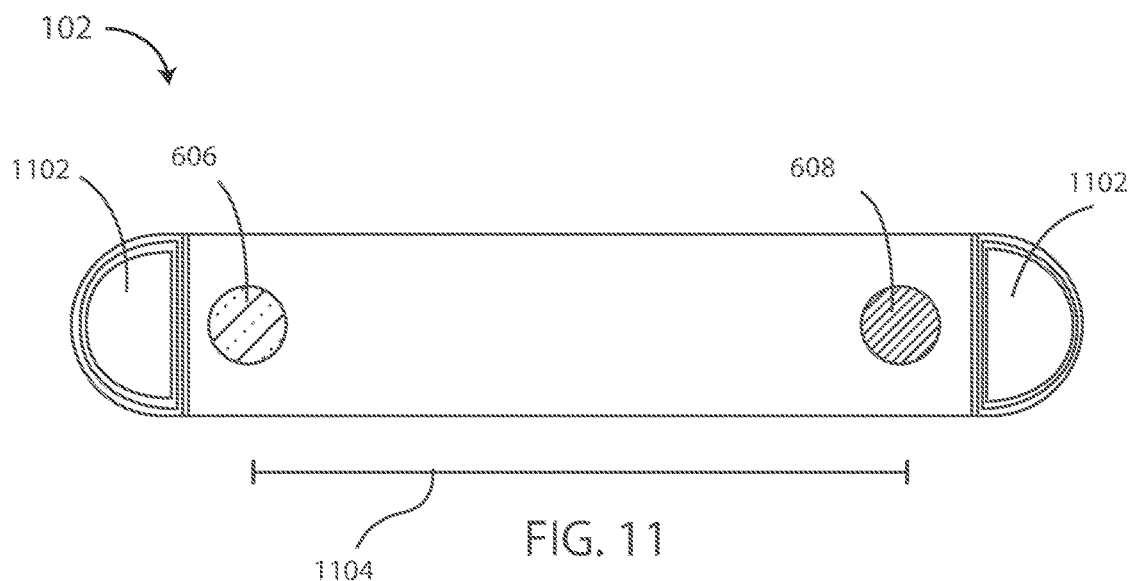
FIG. 11 is a schematic top view of an embodiment of a pulmonary congestion monitoring device in accordance with various embodiments herein.
Figure 12:
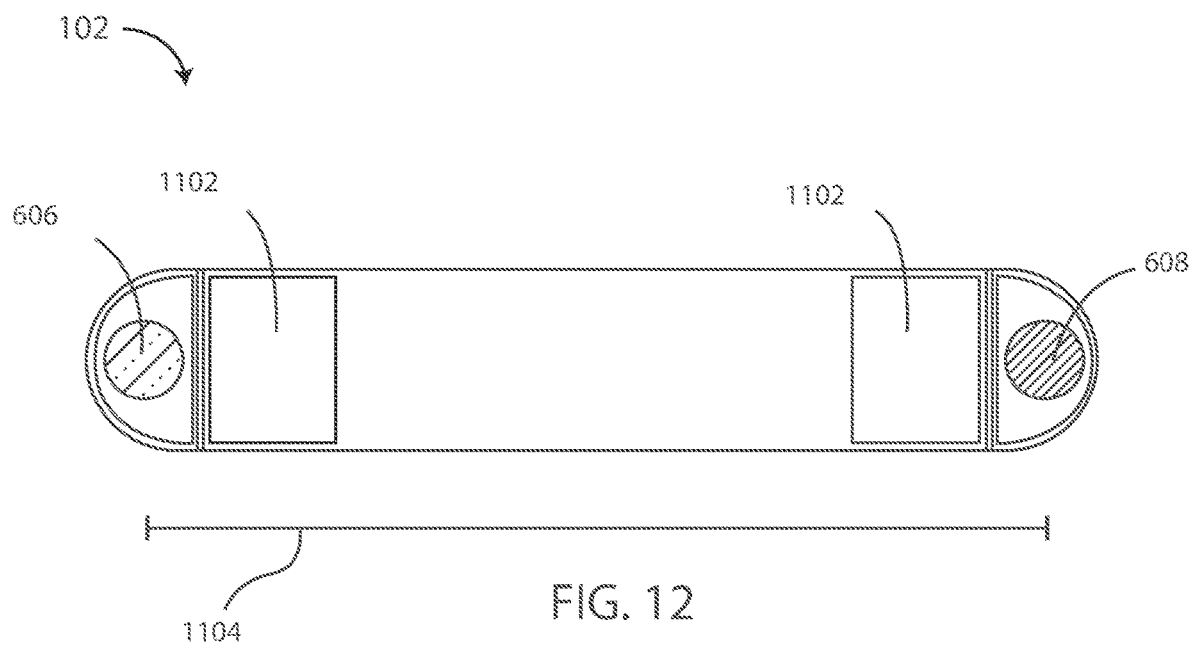
FIG. 12 is a schematic top view of an embodiment of a pulmonary congestion monitoring device in accordance with various embodiments herein.

Referring now to FIGS. 11-12, schematic views of additional embodiments of the pulmonary congestion monitoring devices are shown in accordance with various embodiments herein. The pulmonary congestion monitoring devices 102 can include a first optical emitter 606 and a first optical detector 608. While only one optical emitter and one optical detector are shown in the pulmonary congestion monitoring devices 102 of FIGS. 11-12, it will be appreciated that the pulmonary congestion monitoring devices 102 can include more than one optical emitter, more than one optical detector, and a combination of optical emitters and optical detectors. The pulmonary congestion monitoring devices 102 can further include one or more electrodes 1102 disposed along a length of the pulmonary congestion monitoring devices 102. Electrodes 1102 can be configured to function as part of a secondary sensor (such as an ECG sensor) or, in some embodiments, deliver an electrical stimulation therapy to a patient at or near a treatment site, as will be discussed elsewhere herein.

The first optical emitter 606 and the first optical detector 608, as shown in FIGS. 11 and 12 can be disposed along a length of the pulmonary congestion monitoring device separated by a predetermined distance 1104. Predetermined distance 1104 can include a distance such that the first optical emitter 606 and the first optical detector 608 are spaced along a length of the pulmonary congestion monitoring device from 1 cm to 10 cm apart. In some embodiments, a predetermined distance 1104 between the first optical emitter and the first optical detector can be greater than or equal to 1 cm, 2 cm, 3 cm, 4 cm, 5 cm, 6 cm, 7 cm, 8 cm, 9 cm, 10 cm, 11 cm, 12 cm, 13 cm, 14 cm, or 15 cm, or can be an amount falling within a range between any of the foregoing.

In FIG. 11, the first optical emitter 606 and the first optical detector 608 are positioned between electrodes 1102. In some cases, this can be advantageous because depending on the overall dimensions of the device there may be limited space inside of the device in the areas at the ends of the device. However, in FIG. 12, the first optical emitter 606 and the first optical detector 608 are positioned outside of electrodes 1102. In some cases, this can be advantageous to achieve a maximal spacing between the emitter and detector for a given overall device size. This can be important because a significant factor in the depth of light propagation through the tissue is the distance between the emitter and the detector where a greater distance generally results in a greater depth of propagation through the tissue.

Figure 13:
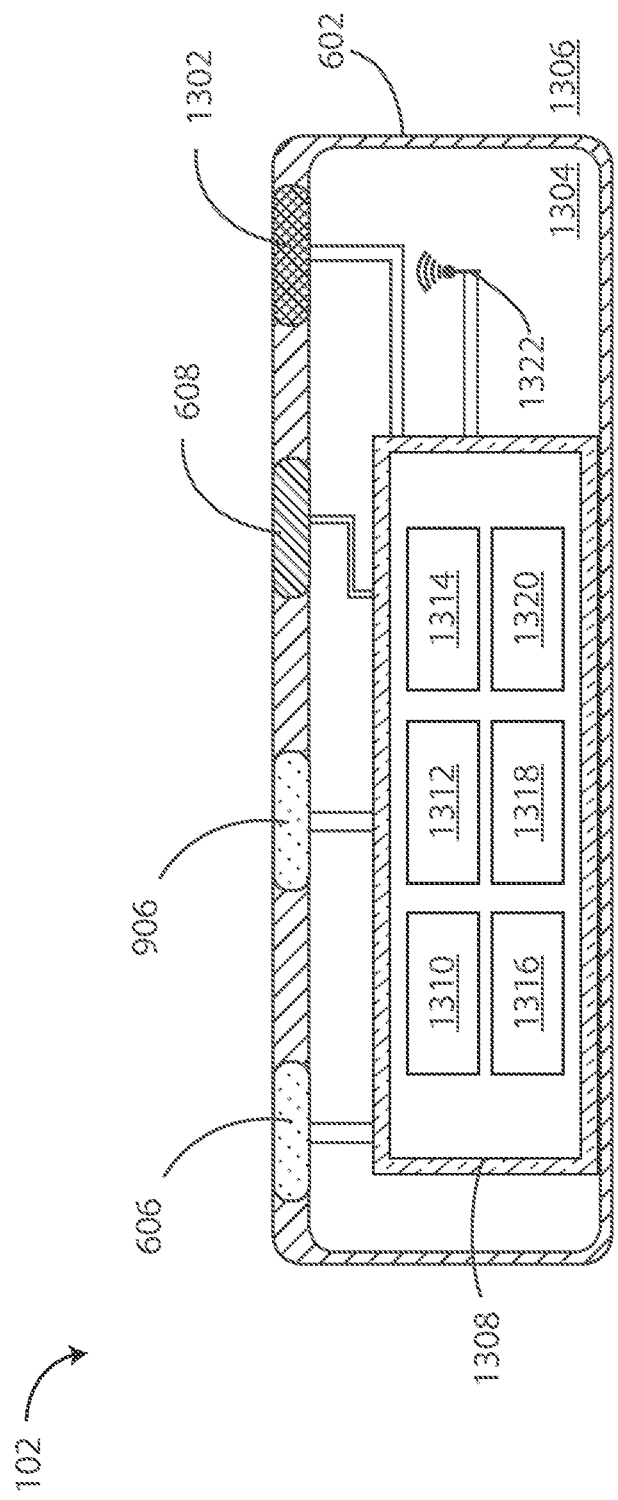
FIG. 13 is a schematic cross-sectional view of a pulmonary congestion monitoring device in accordance with various embodiments herein.

Referring now to FIG. 13, a schematic cross-sectional view of a pulmonary congestion monitoring device 102 is shown in accordance with various embodiments herein. The pulmonary congestion monitoring device 102 can include housing 602. The housing 602 of pulmonary congestion monitoring device 102 can include various materials such as metals, polymers, ceramics, and the like. In some embodiments, all or part of housing 602 can be transparent. In some embodiments, the housing 602 can be a single integrated unit. In other embodiments, the housing 602 can include housing 602 and header (not shown in this view) as discussed above. In some embodiments, the housing 602, or one or more portions thereof, can be formed of a biocompatible metal, such as titanium. In some embodiments, one or more segments of the housing 602 can be hermetically sealed.

Housing 602 can define an interior volume 1304 that in some embodiments is hermetically sealed off from the area 1306 outside of pulmonary congestion monitoring device 102. The pulmonary congestion monitoring device 102 can include control circuitry 1308. Control circuitry 1308 can include various components, such as components 1310, 1312, 1314, 1316, 1318, and 1320. In some embodiments, some or all of these components can be integrated and in other embodiments these components can be separate. In some embodiments, the components can include one or more of a microprocessor, memory circuitry (such as random-access memory (RAM) and/or read only memory (ROM)), recorder circuitry, telemetry circuitry, measurement circuitry, chemical sensor interface circuitry, power supply circuitry (which can include one or more batteries), normalization circuitry, pulmonary congestion monitoring device control circuitry, optical emitter control circuitry, optical detector control circuitry, and the like. In some embodiments, recorder circuitry can record the data produced by the pulmonary congestion monitoring device and record time stamps regarding the same. In some embodiments, the circuitry can be hardwired to execute various functions, while in other embodiments the circuitry can be implemented as instructions executing on a microprocessor or other computation device. In various embodiments, pulmonary congestion monitoring device further includes a measurement circuit configured to control operation of the optical emitter(s) and the optical detector(s).

A telemetry interface 1322 can be provided for communicating with external devices such as a programmer, a home-based unit, and/or a mobile unit (e.g., a cellular phone, portable computer, etc.) or a wearable medical device. In some embodiments telemetry interface 1322 can be provided for communicating with implanted devices such as a therapy delivery device (e.g., a pacemaker, cardioverter-defibrillator, or the like) or monitoring-only device (e.g., an implantable loop recorder). In some embodiments, the circuitry can be implemented remotely, via either near-field, far-field, conducted, intra-body or extracorporeal communication, from instructions executing on any of the external or the implanted devices, etc. In some embodiments, the telemetry interface 1322 can be located within housing 602. In some embodiments, the telemetry interface 1322 can be located in header 604.

Various optical emitters, optical detectors, and other secondary sensors as described elsewhere herein can be in electrical communication with the circuitry. FIG. 13, shows a first optical emitter 606, a second optical emitter 906, a first optical detector 608 and a secondary sensor 1302 in electrical communication with the control circuitry 1308 within the interior volume 1304. In some embodiments, the control circuitry 1308 is configured to selectively activate first optical emitter 606, the second optical emitter 906, the first optical detector 608 and the secondary sensor 1302. It will be appreciated that the control circuitry 1308 can be configured to selectively activate any number of optical emitters, optical detectors, and secondary sensors.

The secondary sensor 1302 can include, but is not to be limited to, one or more of a pulse oximetry sensor, a chemical sensor, a posture sensor, or a heart rate sensor. The secondary sensor 1302 can be configured to use electrical, optical, pressure, acoustic, or other techniques. In one example, the secondary sensor 1302 can include one or more electrodes to detect electrical properties including, but not limited to, impedance, electrical potential such as in the case of an ECG signal, and the like. In another example, the secondary sensor 1302 can include a microphone or device to detect pressure waves or vibration such as an accelerometer to detect characteristics sounds associated with the heart, lungs, or other physiological activity. In another example, the secondary sensor 1302 can include an accelerometer to detect posture. Aspects of exemplary chemical sensors are described in U.S. Pat. Nos. 7,809,441 and 8,126,554, the content of which is herein incorporated by reference.

It will be appreciated that there can be advantages associated with spacing emitters and detectors as far apart as possible to achieve deep tissue propagation of the emitted light. Generally, a limit on maximum spacing is the overall dimensions of the device and/or portions thereof such as the housing. However, in some embodiments, to achieve greater spacing, another structure can be attached to the device and components such as the emitter and/or detector can be mounted thereon. In this way, a maximum distance of separation can be increased based on the length of the structure added. Such a structure can take various forms. In some embodiments, the structure can be substantially rigid while in other embodiments the structure can be flexible. While not intending to be bound by theory it can be advantageous to include a flexible structure because a long rigid device can be more likely to cause discomfort for the individual into which the device is implanted (in an implantable embodiment). Thus, in various embodiments, the pulmonary congestion monitoring device can include a flexible member. Flexible members embodied herein can assume many shapes, sizes, and configurations suitable for placement within a patient. In some embodiments, the flexible member can be substantially hollow other than components disposed therein. In some embodiments, the flexible member can be non-hollow and filled with a material such as a polymer, a composite, or the like. In contrast, the housing 602 can be substantially rigid. However, in other embodiments the housing 602 itself can also be flexible.

Figure 14:
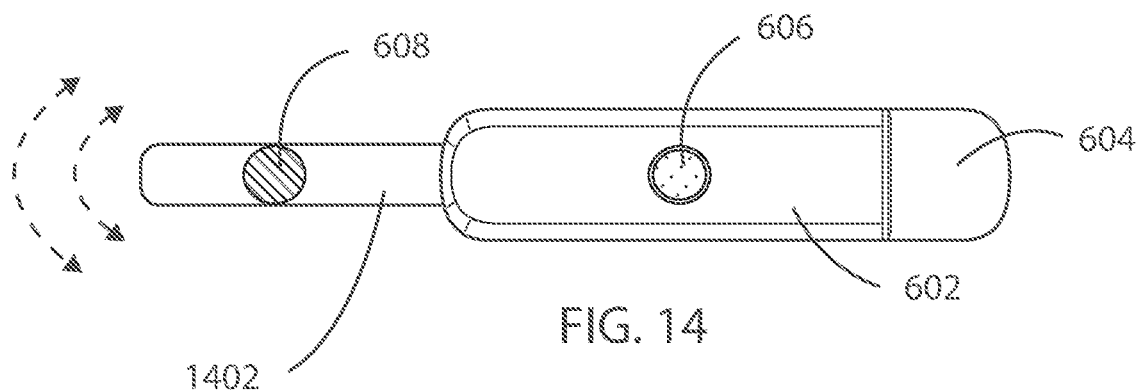
FIG. 14 is a schematic top view of an embodiment of a pulmonary congestion monitoring device in accordance with various embodiments herein.
Figure 15:
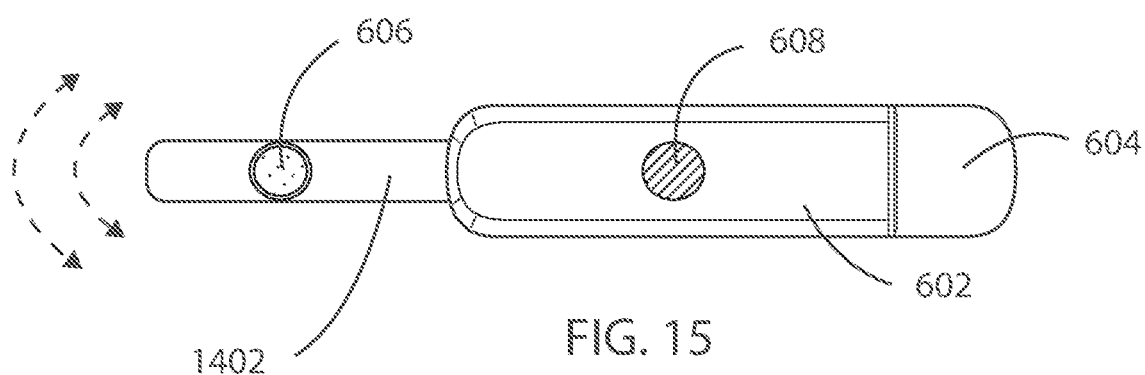
FIG. 15 is a schematic top view of an embodiment of a pulmonary congestion monitoring device in accordance with various embodiments herein.
Figure 16:
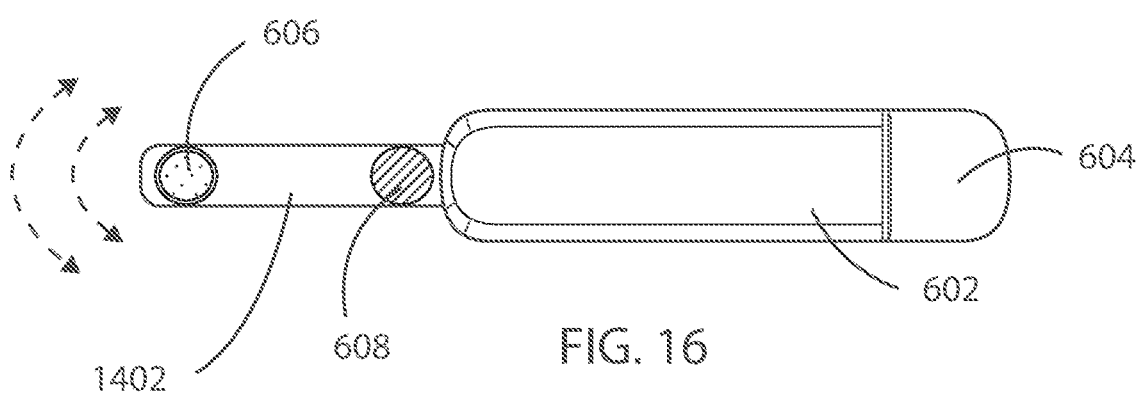
FIG. 16 is a schematic top view of an embodiment of a pulmonary congestion monitoring device in accordance with various embodiments herein.

Referring now to FIGS. 14-16, schematic top plan views of a pulmonary congestion monitoring device having a flexible member are shown in accordance with various embodiments herein. Specifically referring to FIG. 14, the pulmonary congestion monitoring device 102 is shown including a housing 602 and a header 604 coupled to the housing 602. The pulmonary congestion monitoring device 102 can further include a flexible member 1402 extending from the housing 602. In various embodiments, the flexible member 1402 can be connected to the housing and extend outward in a direction away from the housing 602. As depicted in FIG. 14, the flexible member 1402 can extend outwards from the housing 602 on the opposite side of the housing from the header 604. Alternatively, the flexible member 1402 can extend outwards from the housing 602 on the same side of the housing from the header 604 and/or be an appendage of the header 604 itself. The flexible member 1402 can be constructed from a material configured to be bent without damage. In some embodiments, the flexible member 1402 can be formed of a material such as a polymer, an elastomeric polymer, a flexible composite, or the like. In some embodiments, the flexible member 1402 can be of substantially the same diameter and/or circumference as the housing 602, but in other embodiments can be greater or lesser (such as depicted in FIGS. 14-16) in diameter and/or circumference. While not shown in FIGS. 14-16, one or more conductors can interconnect the flexible member and components disposed thereon such as an emitter and/or detector with the other components of the device that may be housed in housing 602.

It will be appreciated that various combinations of optical emitters and optical detectors can be used when a flexible member is present in the pulmonary congestion monitoring devices herein. In various embodiments, the first optical emitter is disposed along a length of the flexible member, while the first optical detector is disposed along the housing. In various embodiments, the first optical detector is disposed along a length of the flexible member, while the first optical emitter is disposed along the housing. In other embodiments, the first optical emitter and the first optical detector are both disposed along a length of the flexible member. However, it is to be understood that various combinations of one or more optical detectors, one or more optical emitters, one or more secondary sensors can be disposed along a pulmonary congestion monitoring device having a flexible member. It will be further understood that in various embodiments, the optical emitters and optical detectors can be disposed together on the same side of the pulmonary congestion monitoring device, while the secondary sensors can be disposed on the opposite side of the pulmonary congestion monitoring device.

The flexible member can take on various dimensions in the length, width, and thickness directions. In a particular embodiment herein, the flexible member can be approximately 1 to 5 cm in length, 0.25 cm to 1.5 cm wide, and 0.25 cm to 1.0 cm thick. In various embodiments, the flexible member is from 1 centimeter (cm) to 3 cm in length. In some embodiments, the length of flexible member 1402 can be greater than or equal to 1 cm, 2 cm, 3 cm, 4 cm, or 5 cm, or more, or can be an amount falling within a range between any of the foregoing. In some embodiments, the flexible member 1402 can be about 0.25 cm, 0.5 cm, 0.75 cm, 1.0 cm, or 2.0 cm in width. In some embodiments the length can be in a range wherein any of the foregoing widths can serve as the upper or lower bound of the range, provided that the upper bound is greater than the lower bound. In some embodiments, the flexible member 1402 can be about 0.25 cm, 0.50 cm, 0.75 cm or 1.0 cm, 1.25 cm, 1.50 cm, 1.75 cm, or 2.0 cm thick, or can be an amount falling within a range between any of the foregoing. In some embodiments the thickness can be in a range wherein any of the foregoing thicknesses can serve as the upper or lower bound of the range, provided that the upper bound is greater than the lower bound.

In the embodiment of FIG. 14, the pulmonary congestion monitoring device 102 can include a first optical emitter 606 coupled to the housing and a first optical detector 608 coupled to the flexible member 1402. However, it will be appreciated that the first optical emitter 606 and the first optical detector 608 can be positioned at any location along the pulmonary congestion monitoring device 102, including the flexible member 1402 to achieve optimal propagation of light through the tissue of a patient.

Referring now to FIG. 15, a pulmonary congestion monitoring device 102 is shown in accordance with the embodiments herein. The pulmonary congestion monitoring device 102 can include a housing 602, a header 604 coupled to the housing 602, and a flexible member 1402 extending from the housing 602. In the embodiment of FIG. 15, the pulmonary congestion monitoring device 102 can include a first optical emitter 606 coupled to the flexible member 1402 and a first optical detector 608, coupled to the housing 602.

In some cases, both an emitter and a detector can be disposed on the flexible member. Referring now to FIG. 16, a pulmonary congestion monitoring device 102 is shown in accordance with the embodiments herein. The pulmonary congestion monitoring device 102 can include a housing 602, a header 604 coupled to the housing 602, and a flexible member 1402 extending from the housing 602. The pulmonary congestion monitoring device 102 can include a first optical emitter 606 and a first optical detector 608 each coupled to the flexible member 1402.

While only one optical emitter and one optical detector are shown in the pulmonary congestion monitoring devices 102 of FIGS. 14-16, it will be appreciated that the pulmonary congestion monitoring devices 102 can include more than one optical emitter, more than one optical detector, and a combination of optical emitters and optical detectors disposed anywhere across the length of the pulmonary congestion monitoring device.

Figure 17:
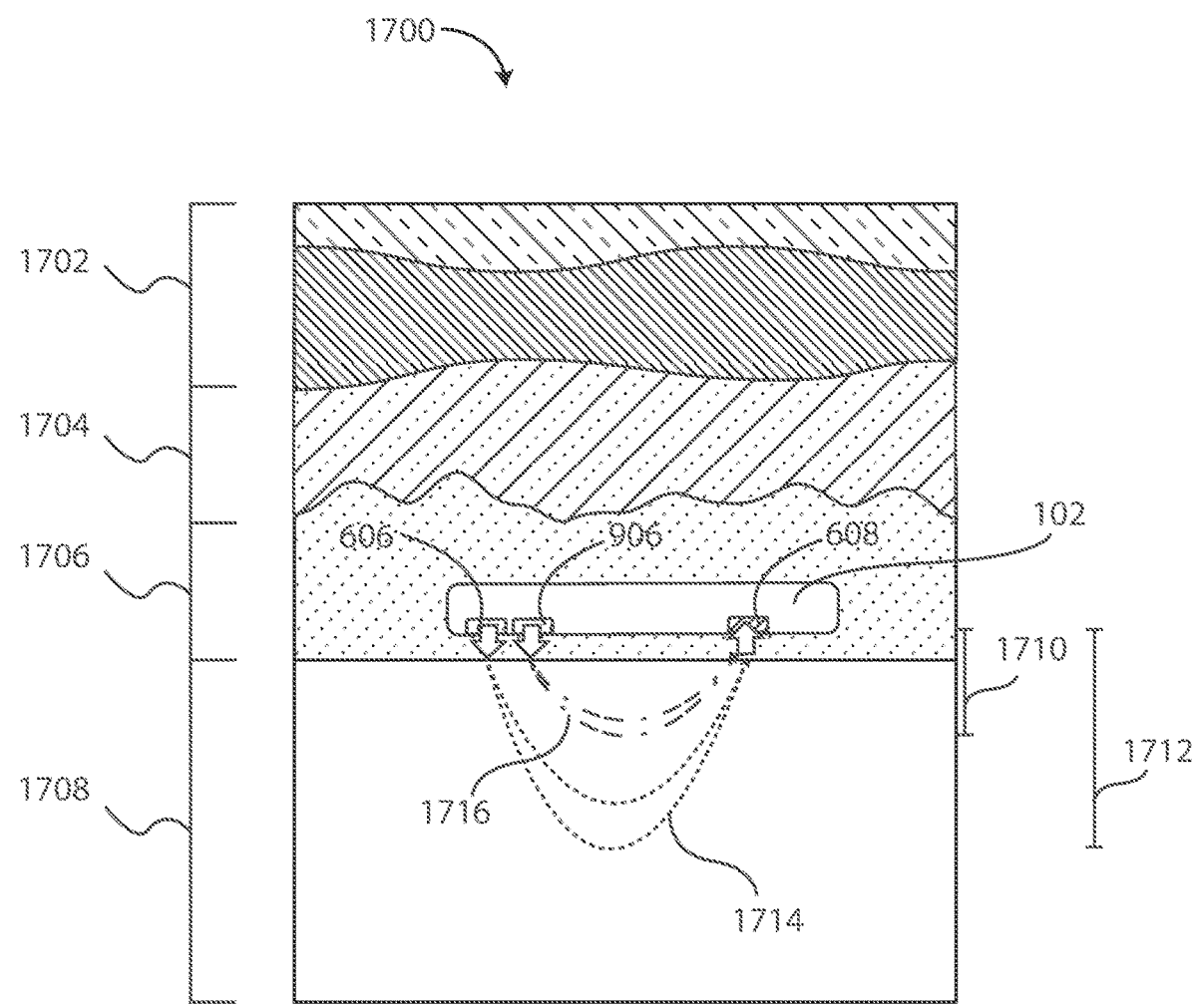
FIG. 17 is a schematic cross-sectional view of a subcutaneous implantation site with an implanted pulmonary congestion monitoring device is shown in accordance with various embodiments herein.

The pulmonary congestion monitoring devices herein can be implanted within various subcutaneous implantation sites or other regions of the inside of the body. Referring now to FIG. 17, a schematic cross-sectional view of a subcutaneous implantation site 1700 with an implanted pulmonary congestion monitoring device 102 is shown in accordance with various embodiments herein. Human skin includes multiple layers including the epidermis 1702 and the dermis 1704. Beneath the layers of human skin and typically above a layer of muscle 1708 is the subcutaneous space that can include a layer of adipose tissue 1706. It will be appreciated that the subcutaneous space further includes additional anatomical structures such as blood vessels, fascia, lymphatic vessels, nervous tissue, hair follicles, and the like.

The pulmonary congestion monitoring device 102 can be disposed at any location within the subcutaneous space. In various embodiments, the pulmonary congestion monitoring device 102 can even be implanted deeper within the body, such as within underlying muscle, within a cavity, such as the chest cavity, adjacent to or within an internal organ of the body, within a blood vessel, the airway, or the like. In various embodiments, the pulmonary congestion monitoring device 102 can be held in place via sutures. In some embodiments, the pulmonary congestion monitoring device 102 can include one or more apertures to facilitate its fixation via sutures. The pulmonary congestion monitoring device 102 can be implanted within a patient such that each of the optical emitters and optical detectors included on the pulmonary congestion monitoring device 102 are disposed facing the interior of a patient's body and are directed toward the volume of the tissue to be monitored. In some embodiments, the tissue to be monitored includes lung tissue, airway tissue, cardiovascular tissue, and the like. Implanting the pulmonary congestion monitoring device 102 facing the interior of a patient's body can selectively direct emitted light toward tissues to be illuminated inside the patient's body.

The pulmonary congestion monitoring device 102 shown in FIG. 17 includes a first optical emitter 606, a second optical emitter 906, and a first optical detector 608. In various embodiments, the pulmonary congestion monitoring device 102 can be configured such that the emitted light 1714 from the first optical emitter 606 at a first wavelength is propagated to a first depth 1710 from a surface of the pulmonary congestion monitoring device 102, and the emitted light 1716 from the second optical emitter 906 at a second wavelength is propagated to a second depth 1712 from a surface of the pulmonary congestion monitoring device 102. In various embodiments, the pulmonary congestion monitoring device 102 can be configured such that emitted light 1714 from the first optical emitter 606 is propagated to a different depth than emitted light 1716 from the second optical emitter 906.

In various embodiments, the depth of emitted light propagated into the tissue of the patient can be tailored by changing the distance between the first optical emitter 606 and second optical emitter 906, and the first optical detector 608, where various distances suitable for use between the optical emitters and optical detectors are discussed elsewhere herein. In some embodiments, the depth of emitted light propagated into the tissue of the patient can also be tailored by selecting various wavelengths of light to be emitted by the first optical emitter 606 and second optical emitter 906. In some embodiments, the first wavelength and second wavelength are different wavelengths. Wavelengths suitable for use in the pulmonary congestion monitoring devices described are discussed elsewhere herein.

Without being bound by any particular theory, it is believed that light generally follows a direct path through a medium in the absence of scattering factors. However, in more complex media where scattering is prevalent, it is believed that light propagation through such media occurs by way of random scattering. Biological tissue is complex, as it is comprised of many tissue types with complex molecules and compounds distributed therein. It is believed that light propagation through biological tissue is due to scattering as caused by the difference in the index of refraction of the various molecules and compounds in the tissues. By way of example, scattering of light can occur in the blood due to the difference of the index of refraction between red blood cells and plasma, and can occur in other tissues due to the difference of the index of refraction between cells, including cellular organelles, and cellular fluids, such as intracellular fluids and extracellular fluids. The resultant path for the emitted light from the optical emitter to the optical detector through biological tissues can assume a broad, arc-shaped optical path as it returns to the optical detector. The arc-shaped optical path becomes deeper as the distance between the emitter and detector increases (all other factors being equal).

Figure 18:
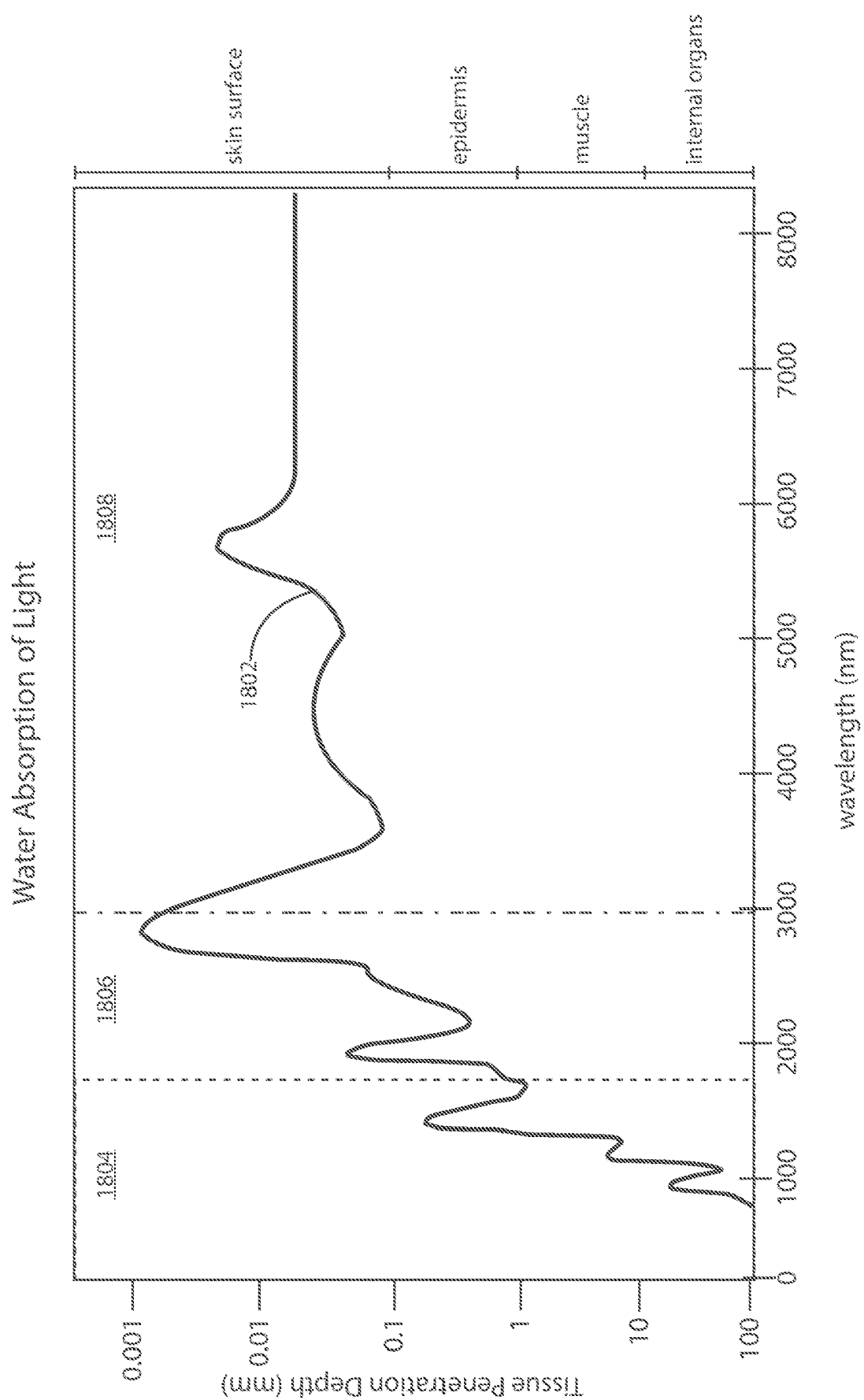
FIG. 18 is a representative plot of water absorption of light at various wavelengths illustrating tissue penetration depth in accordance with various embodiments herein.

However, it will be appreciated that light cannot propagate far if it gets absorbed. Absorption of light by components in tissue such as water varies with wavelength. Referring now to FIG. 18, a graphical representation of water absorption of light at various wavelengths illustrating tissue penetration depth is shown in accordance with the embodiments herein. The tissue penetration depth in millimeters (mm) as a function of wavelength in nanometers (nm) is represented as plot 1802. At wavelengths of from 700 nm to 1700 nm, represented in section 1804 of plot 1802, the tissue penetration depth is from roughly 0.1 mm to 100 mm, which includes depths that penetrate within the epidermis, muscle, internal organs. At wavelengths of from 1700 nm to 3000 nm, represented in section 1806 of plot 1802, the tissue penetration depth is only from roughly 1 mm to 0.001 mm, which includes portions of the epidermis and the skin surface. At wavelengths greater than 3000 nm, represented in section 1808 of plot 1802, the tissue penetration depth is only 0.1 mm or less, which includes superficial portions of the epidermis and the skin surface. Thus, as can be seen, the specific wavelength chosen impacts the maximum depth of propagation through the tissue. In embodiments herein, wavelengths are selected (as also described elsewhere herein) to provide for deep tissue propagation of the emitted light.

Figure 19:
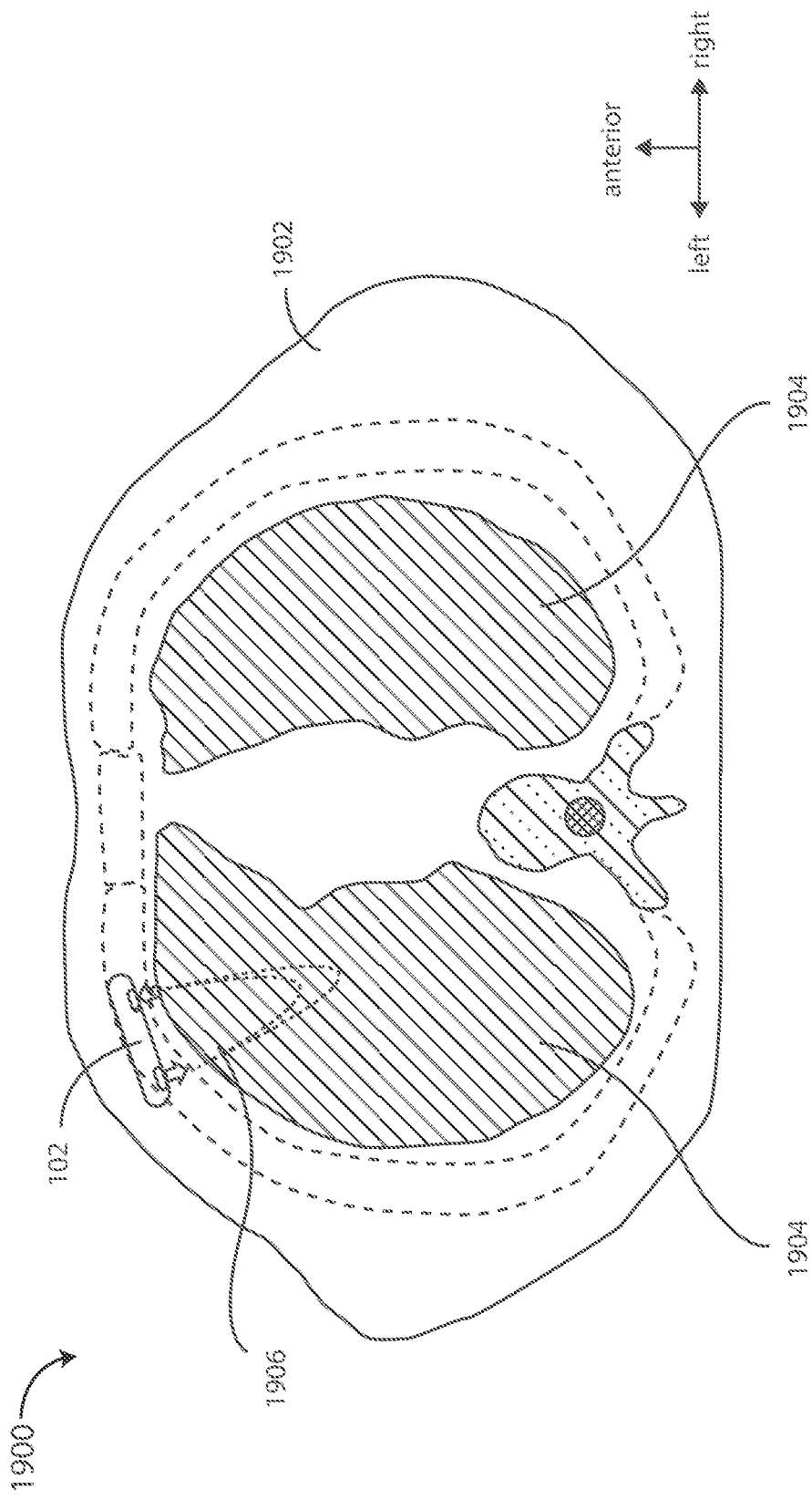
FIG. 19 is a schematic cross-sectional view of a human thorax with an implanted pulmonary congestion monitoring device positioned therein to measure pulmonary congestion in lung tissue in accordance with various embodiments herein.

Referring now to FIG. 19, a schematic cross-sectional view 1900 is shown of a human thorax with an implanted pulmonary congestion monitoring device 102 positioned therein to measure pulmonary congestion in lung tissue in accordance with various embodiments herein. The cross-sectional view 1900 shows the human thorax 1902 includes the left and right lungs 1904. A pulmonary congestion monitoring device 102 is shown positioned within an intercostal space with an optical emitter and an optical detector disposed facing a surface of the lung tissue. The pulmonary congestion monitoring device 102 is shown disposed facing the interior of a patient's body and is directed toward the surface of the tissue to be monitored. In some embodiments, the tissue to be monitored includes lung tissue, cardiovascular tissue, and the like. Implanting the pulmonary congestion monitoring device 102 facing the interior of a patient's body can selectively direct emitted light 1906 toward tissues to be illuminated inside the patient's body.

Figure 20:
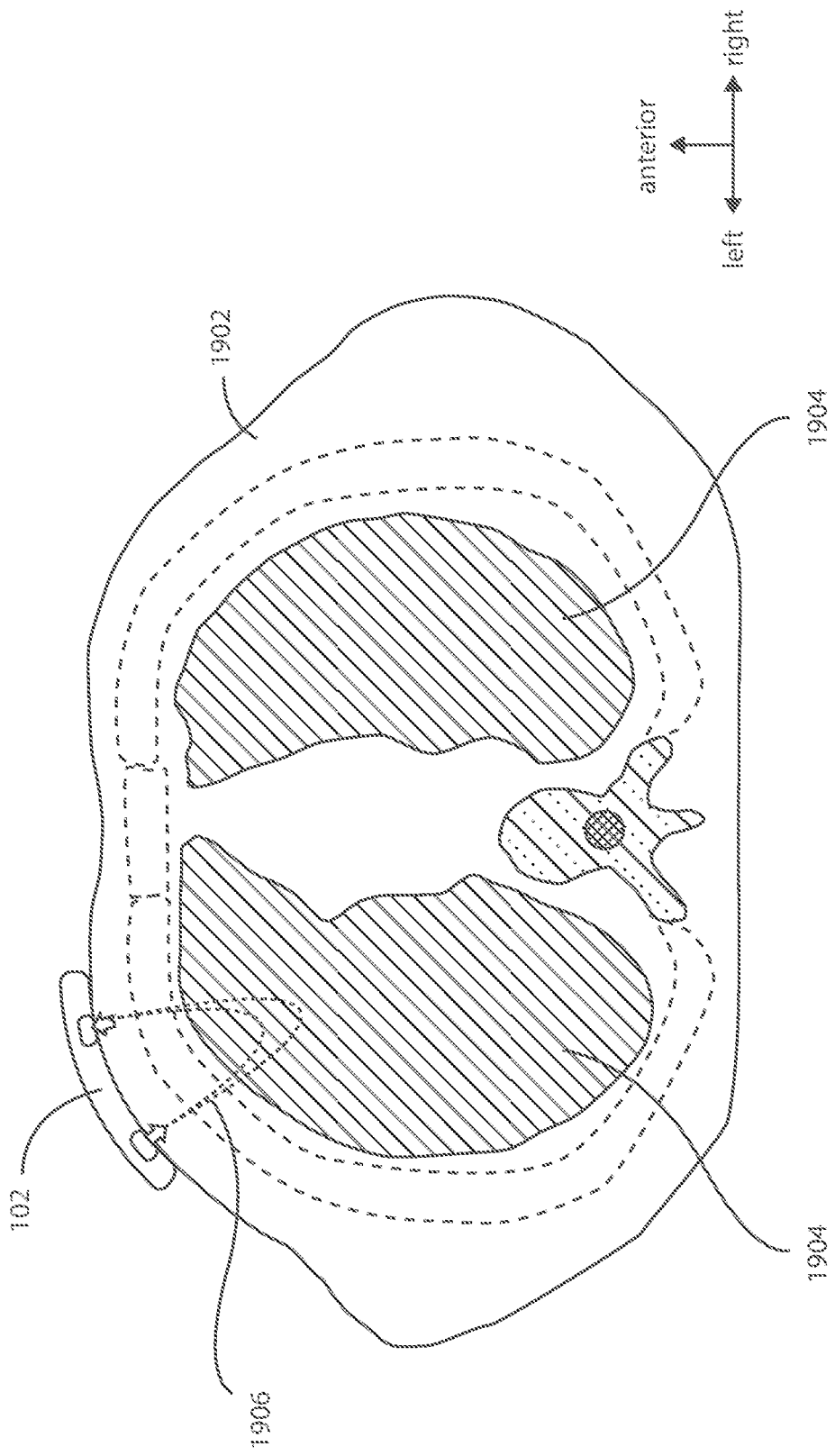
FIG. 20 is a schematic cross-sectional view of a human thorax with a wearable pulmonary congestion monitoring device positioned thereon to measure pulmonary congestion in lung tissue in accordance with various embodiments herein.

Referring now to FIG. 20, a schematic cross-sectional view is shown of a human thorax with a wearable pulmonary congestion monitoring device 102 positioned thereon to measure pulmonary congestion in lung tissue in accordance with various embodiments herein. The cross-sectional view of the human thorax 1902 includes the left and right lungs 1904. A pulmonary congestion monitoring device 102 having an optical emitter and optical detector is shown externally positioned on the skin and over an intercostal space. The pulmonary congestion monitoring device 102 can be held in place using a wearable strap, such as described with respect to FIG. 3, or using an adhesive, or other skin mountable fixation device. The pulmonary congestion monitoring device 102 is shown disposed facing the interior of a patient's body and is directed toward the surface of the tissue to be monitored. In some embodiments, the tissue to be monitored can include lung tissue, airway tissue, cardiovascular tissue, or any other anatomical structure of interest in the body. Implanting the pulmonary congestion monitoring device 102 with the emitter(s) and detector(s) thereof facing the interior of a patient's body can selectively direct emitted light 1906 toward tissues to be illuminated inside the patient's body.

Figure 21:
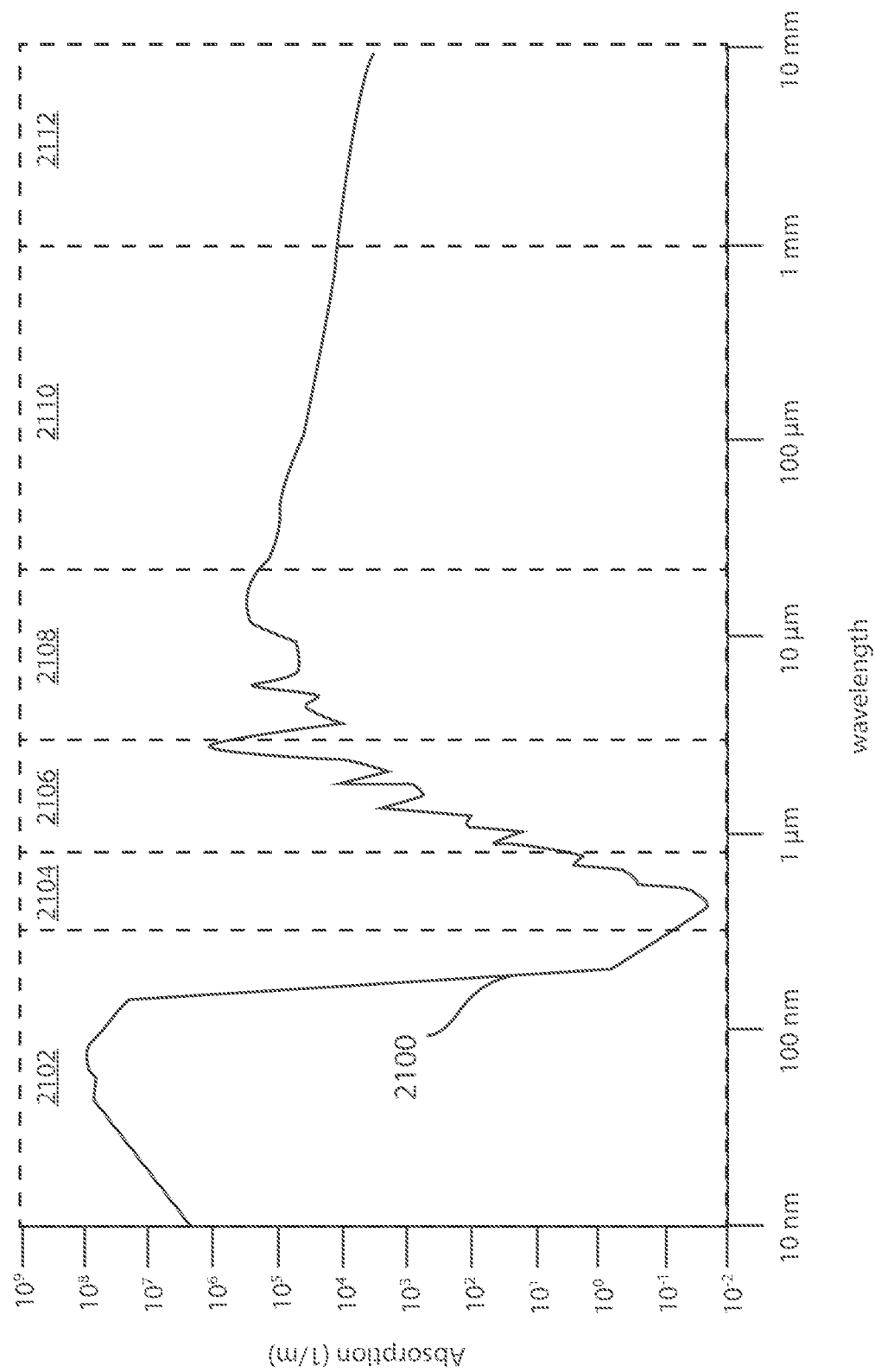
FIG. 21 is a plot of absorption versus wavelength in accordance with various embodiments herein.

Tissues that contain aqueous bodily fluids will exhibit differential absorption depending on an applied wavelength (as explained above). Referring now to FIG. 21, a plot 2100 of absorption versus wavelength is shown in accordance with various embodiments herein. The plot 2100 shows the absorption of various wavelengths by water across a portion of the electromagnetic spectrum. The wavelengths shown include those in the ultraviolet range (from about 10 nm to 400 nm) 2102, visible range (from about 400 nm to 700 nm) 2104, near-infrared range (from about 700 nm to 1.4 μm) 2106, mid-infrared range (from about 1.4 μm to 15 μm) 2108, far-infrared range (from about 15 μm to 1 mm) 2110, and the extremely high frequency range (from about 1 mm to 10 mm) 2112. The plot 2100 shows that water absorbs light efficiently at most wavelengths that are shorter than about 200 nm and longer than about 900 nm. The plot 2100 further shows that water absorbs light less efficiently at wavelengths of between 200 nm to 900 nm. The absorption patterns of water indicates that wavelengths that are shorter than 200 nm and longer than about 900 nm can be effective for use to determine a pulmonary congestion status of a patient using the systems and devices described herein. This is because pulmonary congestion is typically associated with an influx of water and/or mucous (mucous being high in water content) into a tissue and thus pulmonary congestion will favor absorption of light at wavelengths that are shorter than 200 nm and longer than about 900 nm.

Pulmonary Congestion

Lung tissue light absorption at certain frequencies increases with an increase in extravascular lung water concentration. Extravascular lung water (EVLW) can refer to fluid that accumulates in interstitial and alveolar spaces within the lungs. Healthy lung tissue has a larger proportion of air to water, and as a result healthy lung tissue is minimally absorbent at the wavelengths suitable for use herein. In various disease states, the EVLW can displace air within the lung tissue and in some cases the amount of air displaced can be up to about 75% or more. Diseased lung tissue can exhibit a high absorption of light at the wavelengths described herein due to the absorptive properties of water. Airway congestion can also be attributed to an influx of water and/or mucous into the lumen of various bronchial tissues. The presence of water and/or mucous in the lumen of various bronchial tissues, and the swelling of the bronchial tissues themselves, can also result in high absorption of light at the wavelengths described herein.

Figure 22:
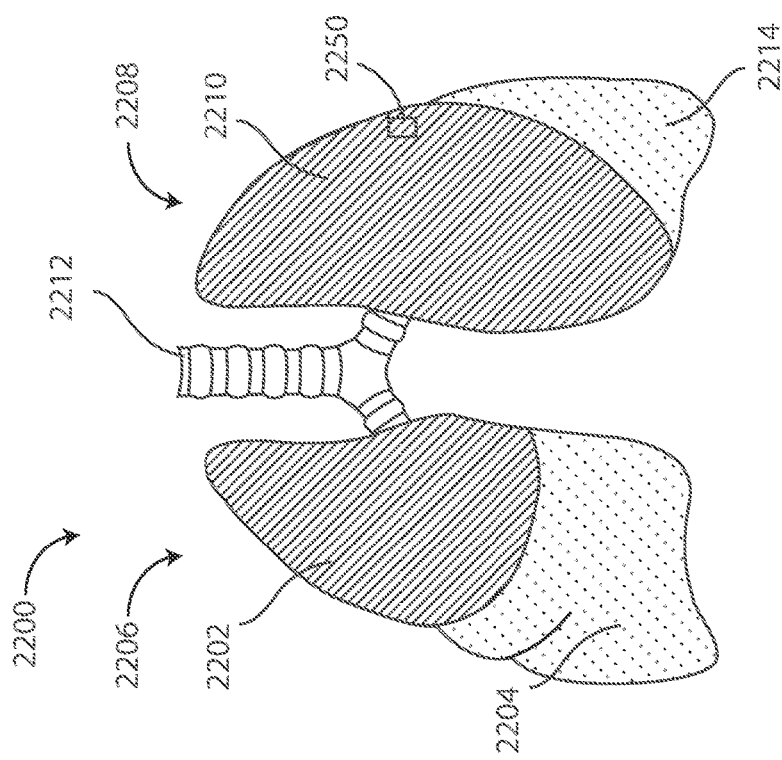
FIG. 22 is a schematic representation of human lungs in accordance with various embodiments herein.

Referring now to FIG. 22, a schematic anterior view of human lungs is shown in accordance with various embodiments herein. The human pulmonary system 2200 includes the right lung 2206, the left lung 2208, and the trachea 2212 and associated bronchial tree. Right lung 2206 includes a right upper portion 2202 and a right lower portion 2204. Left lung 2208 includes a left upper portion 2210 and a left lower portion 2214. Pulmonary congestion status of the lung tissue can be indicative of various disease states, including, but not limited to, chronic obstructive pulmonary disease (COPD), pulmonary edema, asthma, pneumonia, airway obstruction, heart failure, acute respiratory distress syndrome (ARDS), septic shock, or pulmonary embolism. Pulmonary congestion status can be used to determine a disease state in a patient. In some embodiments, various disease states can be detected by measuring a pulmonary congestion status of lung tissue. FIG. 22 shows a particular section 2250 of tissue.

Figure 23:
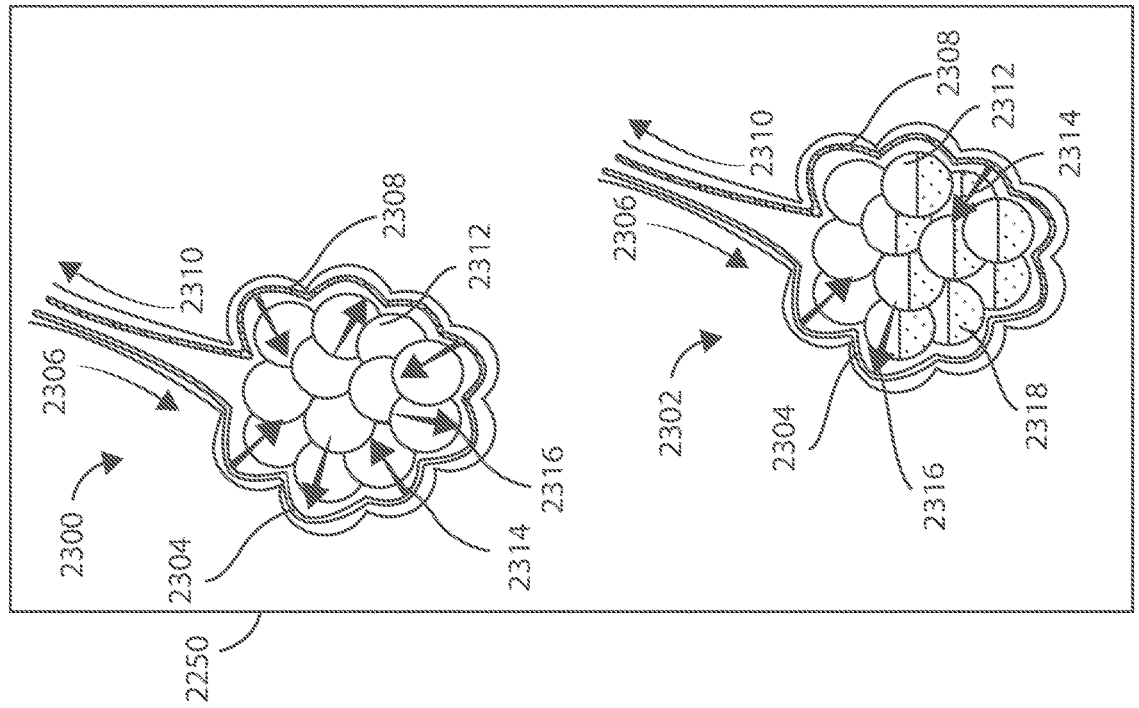
FIG. 23 is a schematic representation of human lung tissue in accordance with various embodiments herein.

An increase of water into the lung tissues can be indicative of alveolar and interstitial congestion. Referring now to FIG. 23, a schematic view of exemplary alveolar sacs found in a section 2250 of tissue are shown in accordance with various embodiments herein. A healthy alveolar sac 2300 includes a capillary bed for the exchange of carbon dioxide 2314 and oxygen 2316 within the individual alveoli. The capillary bed includes a pulmonary arteriole 2304 that brings deoxygenated blood 2306 from the heart into the lungs to release carbon dioxide from the bloodstream and into the lung for exhalation. The capillary bed also includes pulmonary venule 2308 that carries oxygenated blood 2310 back to the heart for return to circulation. Individual alveoli 2312 make up the structure of the alveolar sacs. In healthy lung tissue, the bulk of the volume within the alveoli is air. A diseased alveolar sac 2302 contains the microstructures described in reference to healthy alveolar sac 2300. However, in the diseased alveolar sac 2302 a volume of water 2318 can be present within the volume of alveoli 2312. The absorption of healthy alveolar tissue and diseased alveolar tissue can be measured and/or distinguished and used to determine a disease state of a patient.

Figure 24:
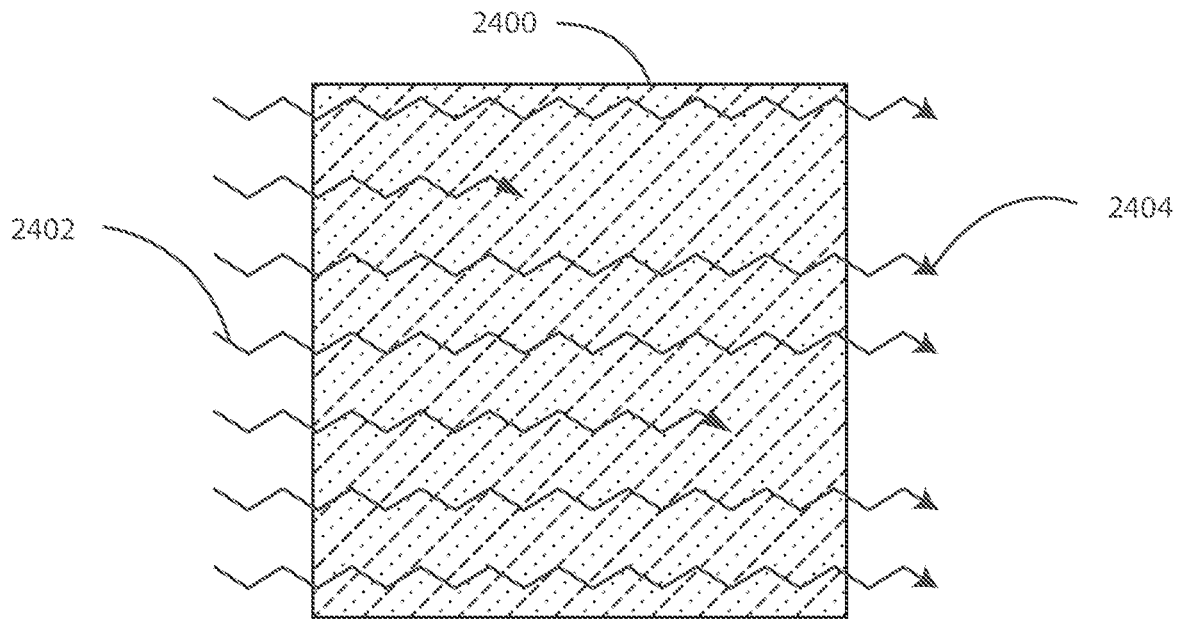
FIG. 24 is a schematic representation of human lung tissue in accordance with various embodiments herein.
Figure 25:
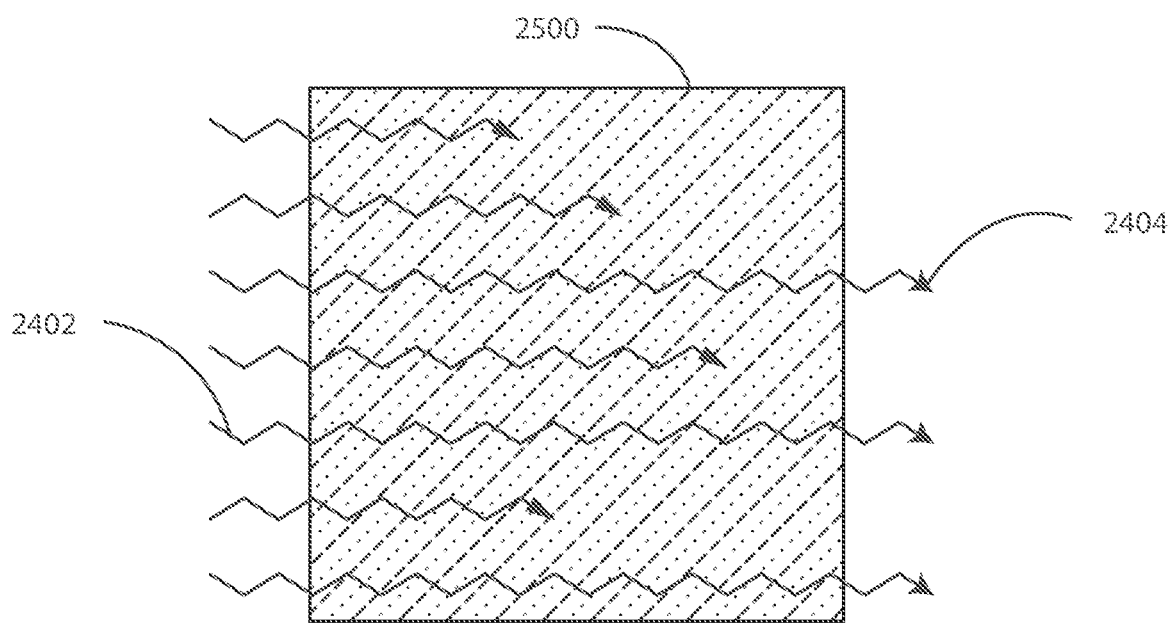
FIG. 25 is a schematic representation of human lung tissue in accordance with various embodiments herein.

Referring now to FIGS. 24 and 25, schematic representations of the absorption of emitted light by healthy alveolar tissue and diseased alveolar tissue are shown in accordance with various embodiments herein. In the embodiment shown in FIG. 24, healthy alveolar tissue 2400 absorbs a smaller percentage of incident light 2402 due to a higher presence of air in the tissue, while the remainder of the reflected light 2404 can be transmitted through the healthy alveolar tissue 2400. In the embodiment shown in FIG. 25, diseased alveolar tissue 2500 absorbs a larger percentage of incident light 2402 due to a higher presence of water in the tissue, while the remainder of the reflected light 2404 can be transmitted through the diseased alveolar tissue 2500.

In healthy alveolar tissue, the amount of incident light absorbed by the healthy alveolar tissue can be from 0% absorption to 30% absorption. In some embodiments, the absorption can be greater than or equal to 0%, 5%, 10%, 15%, 20%, 25%, or 30%, or can be an amount falling within a range between any of the foregoing. In diseased alveolar tissue, the amount of incident light absorbed by the diseased alveolar tissue can be from 30% absorption to 100% absorption. In some embodiments, the absorption can be greater than or equal to 30%, 35%, 40%, 45%, 50%, 55%, 60%, 65%, 70%, 75%, 80%, 85%, 90%, 95%, 100%, or can be an amount falling within a range between any of the foregoing.

Figure 26:
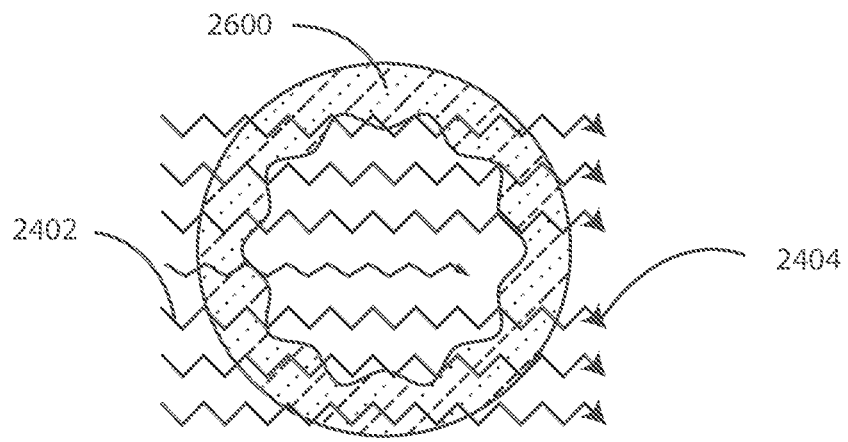
FIG. 26 is a schematic representation of airway tissue in accordance with various embodiments herein.
Figure 27:
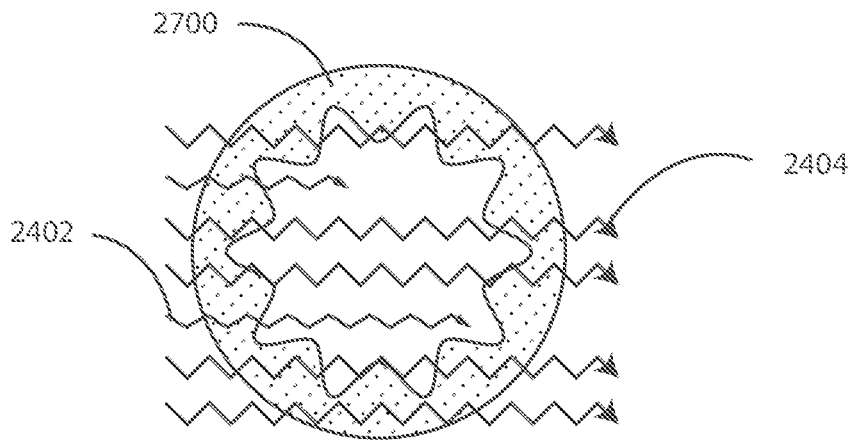
FIG. 27 is a schematic representation of airway tissue in accordance with various embodiments herein.
Figure 28:
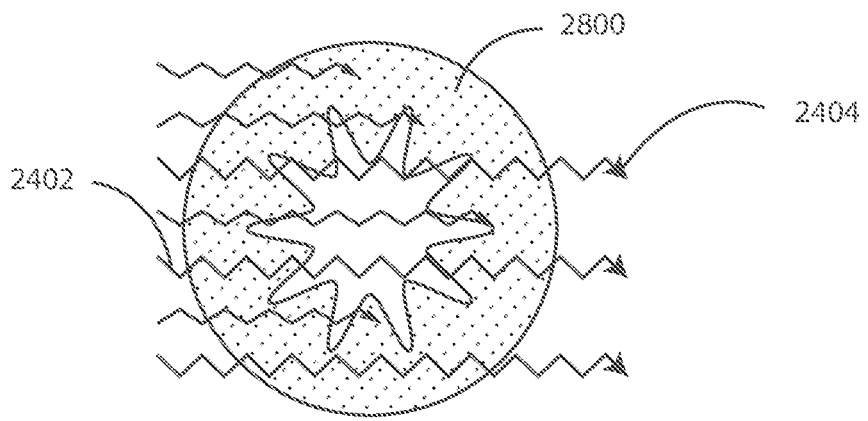
FIG. 28 is a schematic representation of airway tissue in accordance with various embodiments herein.

Beyond lung tissue and alveolar tissue, other pulmonary tissue can also be assessed in a similar manner. Referring now to FIGS. 26 to 28, schematic representations of the absorption of emitted light by healthy airways within the lung tissue and diseased airways within the lung tissue are shown in accordance with various embodiments herein. In various embodiments, the airway tissue can include any of the structures of the bronchial tree including any of the right or left bronchus, the bronchi, the bronchioles, or the trachea. In the embodiment shown in FIG. 26, healthy bronchial tissue 2600 absorbs a smaller percentage of incident light 2402 while allowing the remainder of the reflected light 2404 to be transmitted through the healthy bronchial tissue 2600. In the embodiment shown in FIG. 27, moderately diseased bronchial tissue 2700 absorbs a moderate percentage of incident light 2402 while allowing the remainder of the reflected light 2404 to be transmitted through the moderately diseased bronchial tissue 2700. In the embodiment shown in FIG. 28, severely diseased bronchial tissue 2800 absorbs a larger percentage of incident light 2402 while allowing the remainder of the reflected light 2404 to be transmitted through the severely diseased bronchial tissue 2800. In some embodiments, moderately diseased bronchial tissue can represent the presence of conditions that are under control, such as stable chronic obstructed pulmonary disease and controlled asthma. In contrast, severely diseased bronchial tissue can represent the presence of conditions that are not under control, including acute chronic obstructed pulmonary disease, pulmonary edema, uncontrolled asthma, pneumonia, airway obstruction, heart failure, acute respiratory distress syndrome (ARDS), septic shock, or pulmonary embolism.

In healthy bronchial tissue, the amount of incident light absorbed by the healthy bronchial tissue can be from 0% absorption to 30% absorption. In some embodiments, the absorption can be greater than or equal to 0%, 5%, 10%, 15%, 20%, 25%, or 30%, or can be an amount falling within a range between any of the foregoing. In diseased bronchial tissue, including moderately and severely diseased bronchial tissue, the amount of incident light absorbed by the diseased bronchial can be from 30% absorption to 100% absorption. In some embodiments, the absorption can be greater than or equal to 30%, 35%, 40%, 45%, 50%, 55%, 60%, 65%, 70%, 75%, 80%, 85%, 90%, 95%, 100%, or can be an amount falling within a range between any of the foregoing.

In some embodiments, ratiometric calculations can be used to determine a pulmonary congestion status. In various embodiments, a proportion of air to fluid in the lung tissue can be measured by evaluating a signal from a first optical detector at a first wavelength and a separate signal from a second optical detector at a second wavelength according to the following equation:

$$\text{ratiometric calculation} = \frac{\text{Signal}_{\lambda 1} - \text{Signal}_{\lambda 2}}{\text{Signal}_{\lambda 2}}$$

where λ1 is a first wavelength and λ2 is a second wavelength different than the first wavelength. As discussed herein, the first and second wavelengths can be chosen based on the absorptive properties of water. In some embodiments, the two chosen wavelength can be selected to have substantially different absorbance by water (such as 5, 10, 15, 20, 25, 50, 75, 100 percent or more different in absorbance).

In another embodiment, a proportion of air to fluid in the lung tissue can be measured by evaluating a signal from light propagated into a deep tissue and from light propagated into a shallow tissue according to the following equation:

$$\text{ratiometric calculation} = \frac{\text{Signal}_{deep\ tissue} - \text{Signal}_{shallow\ tissue}}{\text{Signal}_{shallow\ tissue}}$$

where the deep tissue measurements are recorded at greater than one centimeter under the layer of skin of a patient, and the shallow tissue measurements are recorded at tissue depth that is shallower than the deep tissue measurement.

In various embodiments, a proportion of air to fluid in the lung or other pulmonary tissue can be measured by evaluating a signal from the one or more optical detectors and can be determinative of pulmonary congestion. In some embodiments, a proportion of air to fluid in the lung or other pulmonary tissue can be measured by evaluating a signal from one or more optical detectors and can be indicative of a pulmonary edema status.

Tissue Penetration

Spacing of the optical emitters and optical detectors along a length of the pulmonary congestion monitoring devices herein can determine the depth of penetration of the emitted light into the surrounding tissues. By way of non-limiting example, the penetration depth of emitted light can be approximated according to the following equation:

$$\text{light penetration depth} = \sim \frac{1}{2}(\text{spacing between emitter and detector}).$$

In some embodiments, the depth or propagation of the emitter light can be greater than or equal to 1 cm, 2 cm, 3 cm, 4 cm, or 5 cm, or can be an amount falling within a range between any of the foregoing. In various embodiments, the configuration of the pulmonary congestion monitoring device can allow for the propagation of the emitted light into a patient's body and into the lung tissue. In some embodiments, the length between the first optical emitter and the first optical detector can be greater than or equal to 1 cm, 2 cm, 3 cm, 4 cm, 5 cm, 6 cm, 7 cm, 8 cm, 9 cm, 10 cm, 11 cm, 12 cm, 13 cm, 14 cm, or 15 cm, or can be an amount falling within a range between any of the foregoing. In various embodiments, at least 50, 60, 70, 80, 90, 95, 98, or 99 percent of the light incident upon the optical detector and used to determine used to determine a congestion status of the tissue has propagated through a tissue at a depth of at least 1 cm, 2 cm, 3 cm, 4 cm, or 5 cm or more as measured from a surface of the device and/or the optical emitter(s) thereof.

Therapies

In some embodiments, the devices and systems herein can be configured to deliver a therapy to a patient in response to a change in pulmonary congestion detected by the pulmonary congestion monitoring devices herein. In some embodiments, implantable therapeutic devices can be implanted and used in a system in conjunction with the wearable pulmonary congestion monitoring devices described herein. The implantable therapeutic devices can include, but not be limited to cardiac rhythm management devices, an implantable cardioverter-defibrillator (ICD), a left ventricular assist device (LVAD), a pacemaker, and the like.

In various embodiments, the devices and systems herein can be configured to deliver, or modify, a pulmonary congestion therapy to a patient to treat one or more diseases states or conditions including, but not limited to, chronic obstructive pulmonary disease (COPD), pulmonary edema with heart failure with normal cardiac output or abnormal cardiac output, asthma, pneumonia, various airway obstructions, and pulmonary embolism. In some embodiments, a pulmonary congestion therapy can include a command sent to a device such as a ventilation device or other breathing assistance device to change proportions of gases being provided (such as increasing or decreasing oxygen content), change volumes of gases being provided, or the like. In various embodiments, a pulmonary congestion therapy can include a command sent to a device to deliver a drug therapy to reduce water entry into the interstitial and alveolar spaces.

AC/DC Component Calculations

Figure 29:
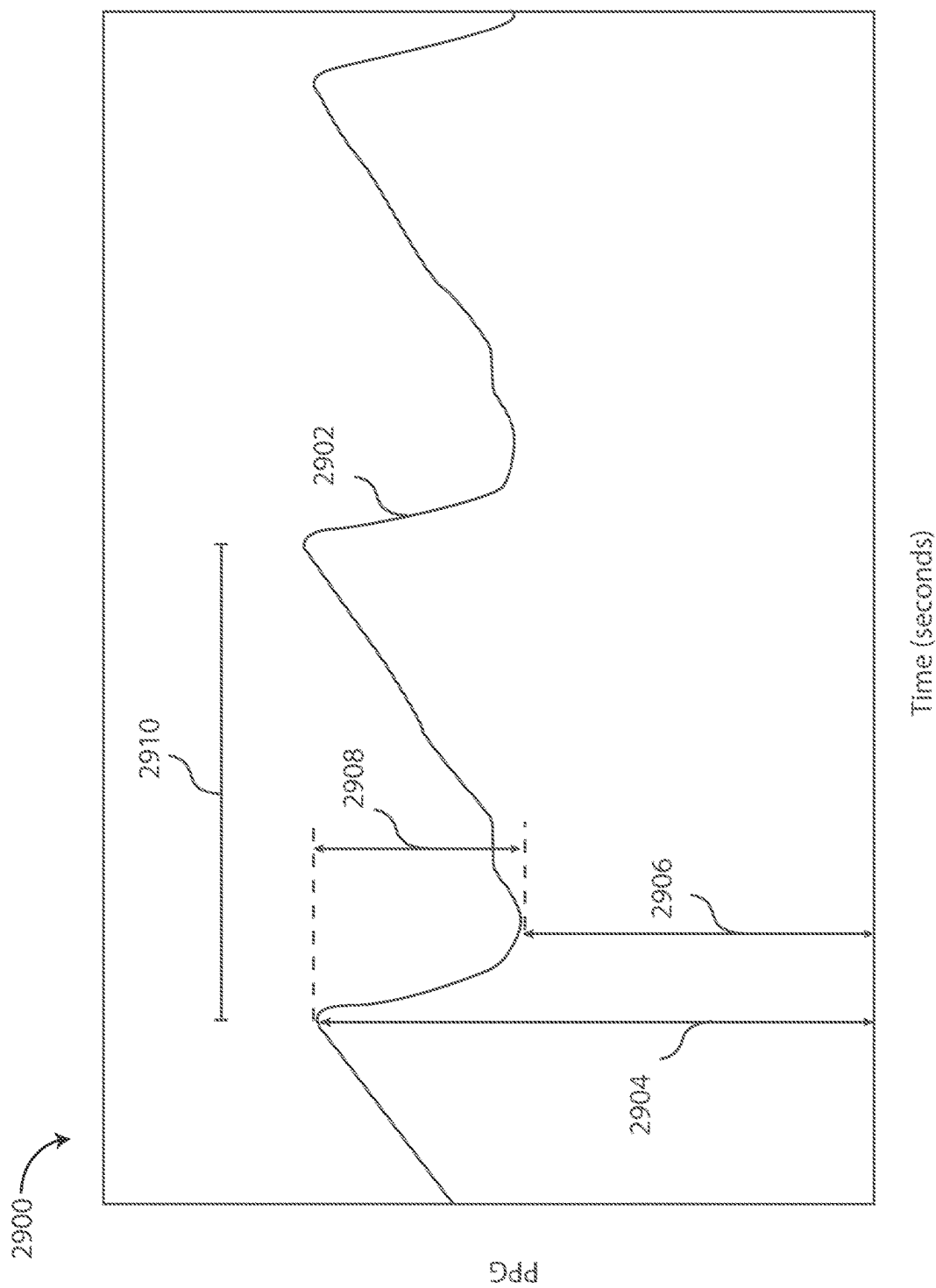
FIG. 29 is a plot of a photoplethysmography waveform versus time in accordance with various embodiments herein.

Referring now to FIG. 29, a graphical representation of an optical waveform signal 2900 is shown in accordance with the embodiments herein. The optical signal can be indicative of the incident light measured at the optical detector of a pulmonary congestion monitoring device. As depicted by FIG. 29, the optical signal can be approximately periodic having period 2910, maximum value 2904 at the systolic peak, and minimum value 2906 at the diastolic valley. In this example, the periodicity of the signal is a consequence of the systole and diastole of the cardiac cycle. During systole, the heart contracts, pushing the oxygenated blood towards the periphery of the body, resulting in an increased blood pressure. During diastole, the hear fills with blood, retracting the blood from the periphery of the body resulting in a decrease in blood pressure. Due to the absorption of light by various chromophores in blood, such as oxyhemoglobin and deoxyhemoglobin, the optical density of the tissue at certain wavelengths can increase during systole and decreases during diastole resulting, in a periodic signal with maximums and minimums. Each cycle of the signal contains a maximum value 2904 at the systolic peak, and minimum value 2906 at the diastolic valley.

The optical signal can, effectively, have an AC (or variable) component 2908 and a DC (or constant) component 2902. The term 'AC', as used herein, refers to a portion of signal that varies relatively rapidly with time. The AC component can be indicative of the portion of the signal originating by pulsations in a patient's blood during each heartbeat. The term 'DC', as used herein signals, refers to portions of the signal that are relatively invariant with time.

As shown and discussed in FIG. 29, the incident light measured by the optical detector of a pulmonary congestion monitoring device can have both an AC and DC components. In various embodiments, both an AC component and a DC component of the light detected by the optical detector are used to determine a property of the tissue (i.e., pulmonary congestion status). In various embodiments, the property can be derived from a ratio of the AC and DC components of the signal as measured by the optical detector. In various embodiments, the property can be derived from a ratio of the AC and DC components of the signal measured by the optical detector at two distinct wavelengths. For instance, the property can be derived using a ratio of ratios (RoR) calculation according to the following equation:

$$\text{airway congestion} \propto \frac{AC_1/DC_1}{AC_2/DC_2}$$

where $AC_1$ is the AC component of the signal measured by the optical detector at the first wavelength; $DC_1$ is the DC component of the signal measured by the optical detector at the first wavelength; $AC_2$ is the AC component of the signal measured by the optical detector at the second wavelength; and $DC_2$ is the DC component of the signal measured by the optical detector at the second wavelength.

Emitter/Detector Characteristics

In some embodiments, the one or more optical emitters can include solid state light sources such as GaAs, GaAlAs, GaAlAsP, GaAlP, GaAsP, GaP, GaN, InGaAlP, InGaN, ZnSe, or SiC light emitting diodes or laser diodes that excite the sensing one or more optical detectors at or near the wavelength of maximum absorption for a time sufficient to emit a return signal. However, it will be understood that in some embodiments the wavelength of maximum absorption/reflection varies as a function of the optical path from the one or more optical emitters to the one or more optical detectors.

In some embodiments, the one or more optical emitters can include other light emitting components including incandescent components. In some embodiments, the optical emitters can include a waveguide. The optical emitters can also include one or more filters such as bandpass filters, high pass filters, low pass filters, and/or other components such as antireflection elements, and/or focusing optics.

In some embodiments, the one or more optical emitters can include a plurality of LEDs with bandpass filters, with each of the LED-filter combinations emitting at a different center frequency. According to various embodiments, the LEDs can operate at different center-frequencies, sequentially turning on and off during a measurement. As multiple different center-frequency measurements are made sequentially, a single unfiltered optical detector can be used in some embodiments. However, in some embodiments, a polychromatic source can be used with multiple detectors that are each bandpass filtered to a particular center frequency.

The one or more optical detectors can be configured to receive light from the optical emitters. In an embodiment, the optical detectors can include a component to receive light. By way of example, in some embodiments, the optical detectors can include a charge-coupled device (CCD). In other embodiments, the optical detectors can include a photodiode, a junction field effect transistor (JFET) type optical sensor, or a complementary metal-oxide semiconductor (CMOS) type optical sensor. In some embodiments, the optical detectors can include an array of optical detecting components. In some embodiments, the optical detectors can include a waveguide. The one or more optical detectors can also include one or more bandpass filters and/or focusing optics. In some embodiments, the optical detectors can include one or more photodiode detectors, each with an optical bandpass filter tuned to a specific wavelength range.

Figure 30:
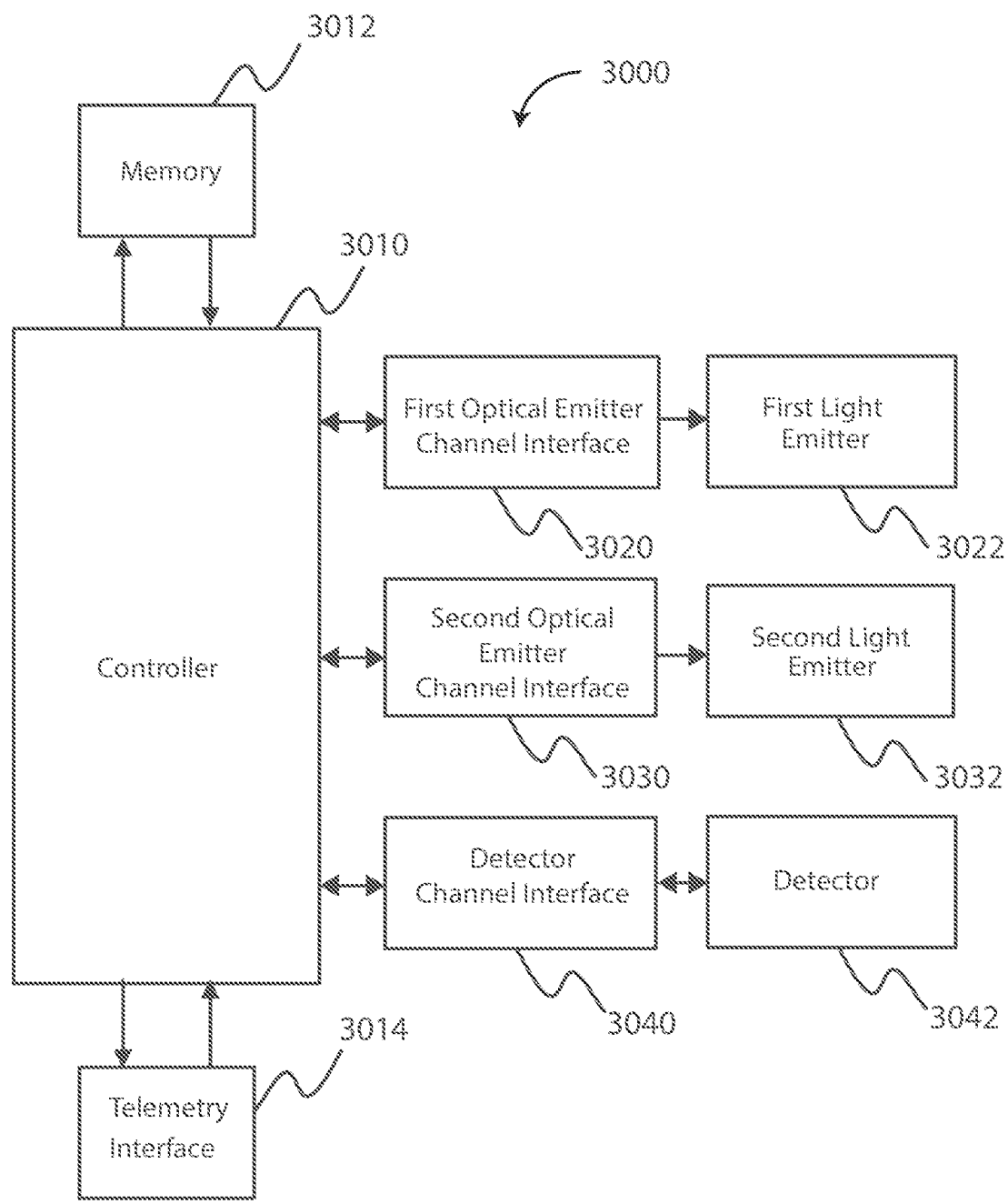
FIG. 30 is a schematic diagram of components of a pulmonary congestion monitoring device in accordance with various embodiments herein.

Referring now to FIG. 30, a schematic block diagram of some components 3000 of a pulmonary congestion monitoring device is shown in accordance with various embodiments herein. It will be appreciated that some embodiments can include additional elements beyond those shown in FIG. 30. In addition, some embodiments may lack some elements shown in FIG. 30. The implantable sensing devices herein can gather information through one or more detecting channels. A controller 3010 can communicate with a memory 3012 via a bidirectional data bus. It will be appreciated that controller 3010 can include one or more microprocessors. The memory 3012 can include read-only memory (ROM) or random-access memory (RAM) for program storage and RAM for data storage, or any combination thereof. The implantable medical device can include one or more optical emitters 3022, 3032, one or more detectors 3042, or one or more secondary sensors (not pictured). The one or more secondary sensors, but are not to be limited to, a pulse oximetry sensor, a chemical sensor, a posture sensor, or a heart rate sensor. The pulmonary congestion monitoring device can further include a measurement circuit configured to control operation of the optical emitters and the optical detectors.

Each optical emitter 3022, 3032 is communicatively coupled to an optical emitter channel interface 3020, 3030. Each detector 3042 is communicatively coupled to a detector channel interface 3040. Each secondary sensor is communicatively coupled to a separate and secondary sensor channel interface (not pictured). Each of the optical emitter channel interfaces 3020, 3030, the detector channel interface 3040, and any of the other secondary sensor channel interfaces can communicate with controller 3010.

The first optical emitter channel interface 3020, the second optical emitter channel interface 3030, and the detector channel interface 3040 can each include various components such as analog-to-digital converters for digitizing signal inputs, sensing amplifiers, registers which can be written to by the control circuitry in order to adjust the gain and threshold values for the sensing amplifiers, source drivers, modulators, demodulators, multiplexers, and the like. A telemetry interface 3014 is also provided for communicating with external devices such as a programmer, a home-based unit, and/or a mobile unit (e.g., a cellular phone, portable computer, etc.), implanted devices such as a pacemaker, cardioverter-defibrillator, loop recorder, and the like.

Methods

Many different methods are contemplated herein, including, but not limited to, methods of making, methods of using, and the like. Aspects of system/device operation described elsewhere herein can be performed as operations of one or more methods in accordance with various embodiments herein.

Figure 31:
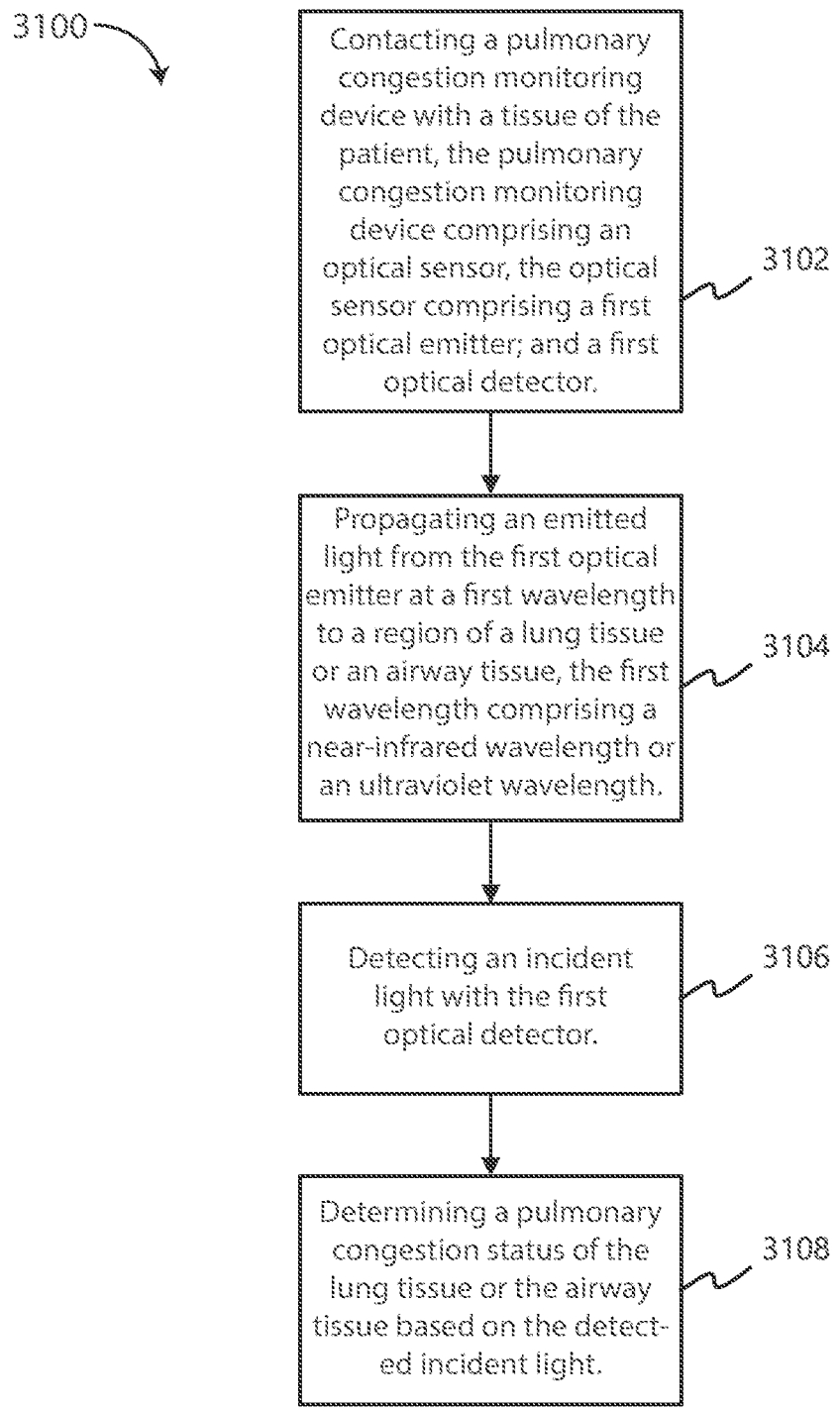
FIG. 31 is a flow diagram of a method in accordance with various embodiments herein.

Referring now to FIG. 31, a method 3100 for measuring a pulmonary congestion status in a patient is shown in accordance with the embodiments herein. The method can include a measuring a pulmonary congestion status in a patient. The method can further include contacting a pulmonary congestion monitoring device with a tissue of the patient, the pulmonary congestion monitoring device can include an optical sensor, the optical sensor can include a first optical emitter, and a first optical detector at 3102. The method can further include propagating an emitted light from the first optical emitter at a first wavelength to a region of a lung tissue or an airway tissue, the first wavelength can include a near-infrared wavelength or an ultraviolet wavelength at 3104. The method can further include detecting an incident light with the first optical detector at 3106. The method can further include determining a pulmonary congestion status of the lung tissue or the airway tissue based on the detected incident light at 3108.

In an embodiment of the method, determining the pulmonary congestion status comprises performing a ratiometric calculation using at least one of a measured light absorption, light scattering, or phase.

In an embodiment, the optical sensor can include: a second optical emitter, and the method further can include propagating an emitted light from the second optical emitter at a second wavelength to a region of the lung tissue or the airway tissue.

In an embodiment of the method, determining the pulmonary congestion status comprises performing a ratiometric calculation using at least one of a measured light absorption, light scattering, or phase of the first wavelength and the second wavelength.

In an embodiment, the method can further include implanting the pulmonary congestion monitoring device subcutaneously at or near a site of a lung tissue and arranged so that the first light emitter and the first light detector are directed toward an interior of the patient toward a surface of the lung tissue.

In an embodiment of the method, the emitted light is propagated at a depth of from 1 cm to 5 cm away from a surface of the pulmonary congestion monitoring device.

In an embodiment of the method, the emitted light is propagated at a first depth and a second depth.

In an embodiment of the method, determining the pulmonary congestion status comprises performing a ratiometric calculation using at least one of a measured absorption, light scattering or phase reflecting the first depth and the second depth.

In an embodiment of the method, determining the pulmonary congestion status of the lung tissue can include measuring at least one physical property of the lung tissue can include extravascular lung water, airway constriction, airway mucous, and airway inflammation.

In an embodiment, the method can further include monitoring a progression or regression of one or more conditions can include chronic obstructive pulmonary disease (COPD), pulmonary edema, asthma, pneumonia, airway obstruction, heart failure, acute respiratory distress syndrome (ARDS), septic shock, or pulmonary embolism.

In an embodiment, the method can further include measuring one or more of a heart rate, a respiratory rate, a tidal volume, circadian rhythm, posture, or an extravascular lung water concentration.

In an embodiment of the method, measuring one or more of a heart rate, a respiratory rate, a tidal volume, circadian rhythm, posture, or an extravascular lung water concentration is further used to determine the pulmonary congestion status.

In an embodiment, the method can further include measuring at least one of light absorption, light scattering, or phase with the first optical detector.

In an embodiment, the method can further include creating a composite score using at least two of the measured light absorption, light scattering, or phase.

In an embodiment, the method can further include calculating an AC signal component and a DC signal component of the detected incident light to determine the pulmonary congestion status of the lung tissue, wherein the AC signal component and the DC signal component are used for determining a ratio of ratios between the ratio of the AC signal component to the DC signal component at the first wavelength to the ratio of the AC signal component to the DC signal component at the second wavelength.

In an embodiment, the method can further include providing a therapy to the patient upon determining the pulmonary congestion status of the lung tissue.

Systems

The devices herein can be used in various systems including multiple pulmonary congestion monitoring devices and secondary sensors, including, but not limited to, methods of making, methods of using, and the like. Aspects of pulmonary congestion monitoring devices described elsewhere herein can be included of one or more embodiments of a system in accordance with various embodiments herein.

In an embodiment, a sensor system is included for detecting a pulmonary congestion status of a patient. The sensor system can include a first pulmonary congestion monitoring device, the first pulmonary congestion monitoring device including a first optical emitter, where the first optical emitter is configured to emit light at a first wavelength from 800 nm to 1000 nm. The system can include a first optical detector, wherein the first optical detector is configured to detect incident light. The system can further include at least one secondary sensor comprising a pulse oximetry sensor, a chemical sensor, a posture sensor, or a heart rate sensor. In the systems described herein, the light from the first optical emitter can be configured to propagate through a lung tissue, in the systems described herein, the detected incident light and secondary sensor data are used to determine a pulmonary congestion status of the lung tissue.

In an embodiment of the system, the system is configured to determine the pulmonary congestion status by utilizing a ratiometric calculation using at least one of a measured light absorption, light scattering, or phase.

In an embodiment of the system, the ratiometric calculation includes a ratio of at least one of a measured absorption, light scattering or phase at a first depth and at a second depth.

In an embodiment of the system, the ratiometric calculation includes a ratio of at least one of a measured absorption, light scattering or phase at a first wavelength and at a second wavelength.

In an embodiment of the system, the system is configured to deliver a therapy to the patient after determining a pulmonary congestion status of the lung tissue.

In an embodiment of the system, at least one of the pulmonary congestion monitoring device or the secondary sensor is implantable.

In an embodiment of the system, the system further includes a second pulmonary congestion monitoring device, the second pulmonary congestion monitoring device including a second optical emitter, where the second optical emitter is configured to emit light; and a second optical detector, where the second optical detector is configured to detect incident light.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A pulmonary congestion monitoring device comprising:
   an implantable housing defining an interior volume, the implantable housing comprising:
      control circuitry disposed within the interior volume;
      a first optical emitter coupled to the implantable housing and in electrical communication with the control circuitry, wherein the first optical emitter is configured to emit light at a first wavelength, wherein the first wavelength is a near-infrared wavelength or an ultraviolet wavelength; and
      a first optical detector coupled to the implantable housing and in electrical communication with the control circuitry, wherein the first optical detector is configured to detect incident light;
   wherein the first optical emitter and the first optical detector are separated by a distance of 1 centimeter (cm) to 10 cm;
   wherein the pulmonary congestion monitoring device is configured so that the light from the first optical emitter propagates through at least one of a lung tissue and an airway tissue;
   wherein the control circuitry is configured to use the detected incident light to determine a congestion status of the lung tissue; and
   wherein the pulmonary congestion monitoring device is configured to be implanted in a subcutaneous tissue of a patient.

2. The device of claim 1, wherein the first wavelength is from 800 nm to 1000 nm.

3. The device of claim 2, wherein propagation of the light through the lung tissue or the airway tissue comprises propagation of the light at a depth from 1 cm to 5 cm as measured from a surface of the device.

4. The device of claim 1, wherein the first wavelength is from 150 nm to 250 nm.

5. The device of claim 1, further comprising a second optical emitter, wherein the second optical emitter is configured to emit light at a second wavelength.

6. The device of claim 5, wherein the second wavelength is from 600 nm to 1400 nm and is different than the first wavelength.

7. The device of claim 5, wherein the second wavelength is from 625 nm to 675 nm.

8. The device of claim 1, further comprising:
   a flexible member, wherein the flexible member is connected to the implantable housing.

9. The device of claim 1, further comprising a secondary sensor disposed within the interior volume of the implantable housing, wherein the secondary sensor comprises a microphone configured to detect sounds associated with physiological activity of the patient.

10. The device of claim 1, further comprising telemetry circuitry disposed within the interior volume of the implantable housing, wherein the telemetry circuitry is configured to command a breathing assistance device to deliver or modify a pulmonary congestion therapy to the patient in response to the detected congestion status of the lung tissue.

11. The device of claim 1, wherein the control circuitry is configured to determine the congestion status of the lung tissue based on an amount of the incident light absorbed by the lung tissue.

12. The device of claim 11, wherein the control circuitry is configured to:
   determine that the lung tissue is healthy if the amount of the incident light absorbed by the lung tissue is between 0% absorption to about 30% absorption; and
   determine that the lung tissue is diseased if the amount of the incident light absorbed by the lung tissue is between about 30% absorption to 100% absorption.

13. A method for measuring a pulmonary congestion status in a patient comprising:
   implanting a pulmonary congestion monitoring device into a subcutaneous tissue of the patient, the pulmonary congestion monitoring device comprising:
      an implantable housing defining an interior volume, the implantable housing comprising:
         control circuitry disposed within the interior volume;
         an optical sensor coupled to the implantable housing and in electrical communication with the control circuitry, the optical sensor comprising:
            a first optical emitter; and
            a first optical detector;
   propagating an emitted light from the first optical emitter at a first wavelength to a region of a lung tissue or an airway tissue, the first wavelength comprising a near-infrared wavelength or an ultraviolet wavelength;
   detecting an incident light with the first optical detector; and
   determining a pulmonary congestion status of the lung tissue or the airway tissue based on only the detected incident light.

14. The method of claim 13, the optical sensor comprising:
   a second optical emitter; and the method further comprising propagating an emitted light from the second optical emitter at a second wavelength to a region of the lung tissue or the airway tissue.

15. The method of claim 14, wherein the emitted light is propagated at a first depth and a second depth.

16. The method of claim 15, wherein determining the pulmonary congestion status comprises performing a ratiometric calculation using at least one of a measured absorption, light scattering, or a phase reflecting the first depth and the second depth of the detected incident light.

17. The method of claim 14, further comprising calculating an AC signal component and a DC signal component of the detected incident light to determine the pulmonary congestion status of the lung tissue, wherein the AC signal component and the DC signal component are used for determining a ratio of ratios between the ratio of the AC signal component to the DC signal component at the first wavelength to the ratio of the AC signal component to the DC signal component at the second wavelength.

18. The method of claim 13, further comprising implanting the pulmonary congestion monitoring device subcutaneously at or near a site of a lung tissue and arranging the pulmonary congestion monitoring device so that the first light emitter and the first light detector are directed toward an interior of the patient toward a surface of the lung tissue.

19. The method of claim 13, wherein the emitted light is propagated at a depth of from 1 cm to 5 cm away from a surface of the pulmonary congestion monitoring device.

20. The method of claim 13, wherein determining the pulmonary congestion status of the lung tissue includes measuring at least one physical property of the lung tissue based on the detected incident light comprising extravascular lung water, airway constriction, airway mucous, and airway inflammation.

* * * * *